(12) United States Patent
Harale et al.

(10) Patent No.: US 11,422,992 B2
(45) Date of Patent: Aug. 23, 2022

(54) AUTO REINFORCED ANOMALY DETECTION

(71) Applicant: ACCENTURE GLOBAL SOLUTIONS LIMITED, Dublin (IE)

(72) Inventors: Nitin Harale, Pune (IN); Sridhar Meenakshisundaram, Chennai (IN); John SasiKumar Manohar, Chennai (IN); Uthra Venkatesan, Coimbatore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 373 days.

(21) Appl. No.: 16/820,213

(22) Filed: Mar. 16, 2020

(65) Prior Publication Data
US 2021/0286780 A1 Sep. 16, 2021

(51) Int. Cl.
*G06F 17/00* (2019.01)
*G06F 16/215* (2019.01)
*G06F 16/2458* (2019.01)
*G06N 3/00* (2006.01)
*G06N 5/04* (2006.01)
*G06N 20/00* (2019.01)

(52) U.S. Cl.
CPC ........ *G06F 16/215* (2019.01); *G06F 16/2458* (2019.01); *G06N 3/006* (2013.01); *G06N 5/04* (2013.01); *G06N 20/00* (2019.01)

(58) Field of Classification Search
CPC ... G06F 16/215; G06F 16/2458; G06N 3/006; G06N 5/04; G06N 20/00
See application file for complete search history.

(56) References Cited

U.S. PATENT DOCUMENTS

| | | | |
|---|---|---|---|
| 8,375,255 | B2 | 2/2013 | Wang et al. |
| 8,417,477 | B2 | 4/2013 | Miguelanez et al. |
| 9,652,354 | B2 | 5/2017 | Filimonov et al. |
| 10,270,788 | B2 * | 4/2019 | Faigon ............... H04L 63/1416 |
| 10,904,274 | B2 * | 1/2021 | Weith .................. H04W 12/06 |

(Continued)

OTHER PUBLICATIONS

Salima Omar et al., "Machine Learning Techniques for Anomaly Detection: An Overview", International Journal of Computer Applications (0975-8887), vol. 79—No. 2, Oct. 2013, pp. 33-41.

(Continued)

*Primary Examiner* — Greta L Robinson
(74) *Attorney, Agent, or Firm* — Mannava & Kang, P.C.

(57) ABSTRACT

Examples of a data anomaly detection system are provided. The system may obtain a query and target data associated with a data anomaly detection requirement. The system may sort the target data into a plurality of data wedges comprising a plurality of events. The system may create a data pattern model for each of the plurality of data wedges. The system may identify a data threshold value and identify a data probity score for each of the plurality of events. The system may create a data probity index and identify a data anomaly cluster for the data pattern model. The system may generate a data anomaly detection result and initiate anomaly detection corresponding to the data anomaly detection requirement. The data anomaly detection result may include the data pattern model deficient of the data anomaly cluster relevant for resolution to the query.

20 Claims, 18 Drawing Sheets

(56) References Cited

U.S. PATENT DOCUMENTS

| | | | |
|---|---|---|---|
| 11,237,897 B2* | 2/2022 | Bhatia | G06K 9/6284 |
| 2013/0198147 A1* | 8/2013 | Jain | G06F 40/216 |
| | | | 707/688 |
| 2019/0081969 A1 | 3/2019 | Phadke et al. | |
| 2021/0049143 A1* | 2/2021 | Jacinto | G06F 16/909 |
| 2021/0049510 A1* | 2/2021 | Adjaoute | G06N 5/04 |
| 2022/0121942 A1* | 4/2022 | Seow | G06N 3/088 |

OTHER PUBLICATIONS

Susan Li, "Time Series of Price Anomaly Detection", Retrieved from the Internet on Aug. 2, 2019, 19 pages. <https://towardsdatascience.com/time-series-of-price-anomaly-detection-13586cd5ff46>.

* cited by examiner

700A

702

| TIME ⬦ | COUNT ⬦ ⁄ |
|---|---|
| 2019-06-03 22:00 | 26 |
| 2019-06-03 23:00 | 773 |
| 2019-06-04 00:00 | 903 |
| 2019-06-04 01:00 | 672 |
| 2019-06-04 02:00 | 845 |
| 2019-06-04 03:00 | 1986 |
| 2019-06-04 04:00 | 902 |

*FIG. 7A*

| TIME | COUNT | TIME1 | COUNT AVG | WEEKDAY |
|---|---|---|---|---|
| 2019-06-03 23:00 | 765 | 23 | 705 | MON |
| 2019-06-04 00:00 | 903 | 00 | 769 | TUE |
| 2019-06-04 01:00 | 672 | 01 | 650 | TUE |
| 2019-06-04 02:00 | 845 | 02 | 742.5 | TUE |
| 2019-06-04 03:00 | 1986 | 03 | 1298 | TUE |
| 2019-06-04 04:00 | 902 | 04 | 783.5 | TUE |
| 2019-06-04 05:00 | 730 | 05 | 825 | TUE |
| 2019-06-04 06:00 | 660 | 06 | 645 | TUE |
| 2019-06-04 07:00 | 843 | 07 | 1069 | TUE |
| 2019-06-04 08:00 | 809 | 08 | 713.5 | TUE |

*FIG. 7B*

| TIME | COUNT | TIME1 | COUNT_AVG | TENMINUS | TENPLUS | WEEKDAY |
|---|---|---|---|---|---|---|
| 2019-06-03 23:00 | 687 | 23 | 666 | 599 | 733 | MON |
| 2019-06-04 00:00 | 903 | 00 | 769 | 692 | 846 | TUE |
| 2019-06-04 01:00 | 672 | 01 | 650 | 585 | 715 | TUE |
| 2019-06-04 02:00 | 845 | 02 | 742.5 | 668 | 817 | TUE |
| 2019-06-04 03:00 | 1986 | 03 | 1298 | 1168 | 1428 | TUE |
| 2019-06-04 04:00 | 902 | 04 | 783.5 | 705 | 862 | TUE |
| 2019-06-04 05:00 | 730 | 05 | 825 | 743 | 908 | TUE |
| 2019-06-04 06:00 | 660 | 06 | 645 | 581 | 710 | TUE |
| 2019-06-04 07:00 | 843 | 07 | 1069 | 962 | 1176 | TUE |

*FIG. 7C*

| TENMINUS_1DAY_BEFORE | TENPLUS_1DAY_BEFORE | WEEKDAY_1DAY_BEFORE | TIME1_LATEST_DAY | LATEST_DAY | COUNT_AVG_LATEST_DAY | TENMINUS_LATEST_DAY | TENPLUS_LATEST_DAY | WEEKDAY_LATEST_DAY | STATUS |
|---|---|---|---|---|---|---|---|---|---|
| 1594 | 2960 | MON | 00 | 635 | 769 | 538 | 1000 | TUE | 0 |
| 380 | 706 | MON | 01 | 628 | 650 | 455 | 845 | TUE | 0 |
| 394 | 732 | MON | 02 | 640 | 742.5 | 520 | 965 | TUE | 0 |
| 378 | 702 | MON | 03 | 610 | 1298 | 909 | 1687 | TUE | 1 |
| 435 | 809 | MON | 04 | 665 | 783.5 | 548 | 1019 | TUE | 0 |
| 387 | 719 | MON | 05 | 920 → 91.67% | 825 | 578 | 1073 | TUE | 0 |

DATA COLLECTION (RAW DATA) — 802

| | _TIME | CBOMI701 | CBOMI702 | CBSQL701 |
|---|---|---|---|---|
| 0 | 2017-12-11T02:00:00.000-0500 | 0 | 0 | 2132 |
| 1 | 2017-12-11T03:00:00.000-0500 | 0 | 0 | 33 |
| 2 | 2017-12-11T04:00:00.000-0500 | 0 | 0 | 21 |
| 3 | 2017-12-11T05:00:00.000-0500 | 0 | 0 | 32 |
| 4 | 2017-12-11T06:00:00.000-0500 | 0 | 0 | 17 |
| 5 | 2017-12-11T07:00:00.000-0500 | 0 | 0 | 36 |
| 6 | 2017-12-11T08:00:00.000-0500 | 0 | 0 | 20 |
| 7 | 2017-12-11T09:00:00.000-0500 | 0 | 0 | 22 |
| 8 | 2017-12-11T10:00:00.000-0500 | 0 | 0 | 22 |
| 9 | 2017-12-11T11:00:00.000-0500 | 0 | 0 | 15 |
| 10 | 2017-12-11T12:00:00.000-0500 | 0 | 0 | 44 |
| 11 | 2017-12-11T13:00:00.000-0500 | 0 | 0 | 98 |
| 12 | 2017-12-11T14:00:00.000-0500 | 0 | 0 | 31 |
| 13 | 2017-12-11T15:00:00.000-0500 | 0 | 0 | 28 |
| 14 | 2017-12-11T16:00:00.000-0500 | 0 | 0 | 24 |
| 15 | 2017-12-11T17:00:00.000-0500 | 0 | 0 | 24 |
| 16 | 2017-12-11T18:00:00.000-0500 | 0 | 0 | 28 |
| 17 | 2017-12-11T19:00:00.000-0500 | 0 | 0 | 26 |
| 18 | 2017-12-11T20:00:00.000-0500 | 0 | 0 | 26 |
| 19 | 2017-12-11T21:00:00.000-0500 | 0 | 0 | 31 |
| 20 | 2017-12-11T22:00:00.000-0500 | 0 | 0 | 16 |
| 21 | 2017-12-11T23:00:00.000-0500 | 0 | 0 | 30 |
| 22 | 2017-12-12T00:00:00.000-0500 | 0 | 0 | 49 |
| 23 | 2017-12-12T01:00:00.000-0500 | 0 | 0 | 118 |
| 24 | 2017-12-12T02:00:00.000-0500 | 0 | 0 | 6323 |
| 25 | 2017-12-12T03:00:00.000-0500 | 0 | 0 | 21 |
| 26 | 2017-12-12T04:00:00.000-0500 | 0 | 0 | 24 |
| 27 | 2017-12-12T05:00:00.000-0500 | 0 | 0 | 30 |
| 28 | 2017-12-12T06:00:00.000-0500 | 0 | 0 | 15 |
| 29 | 2017-12-12T07:00:00.000-0500 | 0 | 0 | 28 |

```
┌─────────────────────────────────────┐
│ REMOVE RARE EVENTS AND REPORT ANOMALY │◄── 810
└─────────────────────────────────────┘
```

```
1   2017-12-11T01:00:00.000-0500        67
13  2017-12-11T13:00:00.000-0500        98
2   2017-12-11T02:00:00.000-0500      2132
OUTLIERS IN NEXT MONDAY
[81, 114, 208, 6327]
                     _TIME      CBSQL701
0   2017-12-18T00:00:00.000-0500        81
12  2017-12-18T12:00:00.000-0500       114
11  2017-12-18T11:00:00.000-0500       208
2   2017-12-18T02:00:00.000-0500      6327
OUTLIERS IN THIRD MONDAY
[85, 109, 6333]
                     _TIME      CBSQL701
9   2017-12-24T09:00:00.000-0500        85
0   2017-12-24T00:00:00.000-0500       109
2   2017-12-24T02:00:00.000-0500      6333
OUTLIERS IN FOURTH MONDAY
[102, 102, 6398]
                     _TIME      CBSQL701
4   2017-12-31T04:00:00.000-0500       102
14  2017-12-31T14:00:00.000-0500       102
2   2017-12-31T02:00:00.000-0500      6358
OUTLIERS IN FIFTH MONDAY
[94, 95, 6510, 12979]
                     _TIME      CBSQL701
12  2018-01-07T12:00:00.000-0500        94
20  2018-01-07T20:00:00.000-0500        95
2   2018-01-07T02:00:00.000-0500      6510
11  2018-01-07T11:00:00.000-0500     12979
AFTER COMPARISON WITH PREVIOUS WEEKS
                     _TIME      CBSQL701
20  2018-01-07T20:00:00.000-0500        95
2   2018-01-07T02:00:00.000-0500      6510
11  2018-01-07T11:00:00.000-0500     12979
IDENTIFIED RARE EVENT
                     _TIME      CBSQL701
11  2018-01-07T11:00:00.000-0500     12979
```

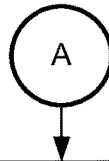

Implementing the first cognitive learning operation to create a data probity index for the data pattern model associated with each of the plurality of data wedges, the data probity index comprising the associated plurality of events arranged in an increasing order based on the data probity score 1114

Implementing a second cognitive learning operation to identify a data anomaly cluster for each data pattern model based on mapping the data probity index for the data pattern model with the data probity index for a historical data pattern model for a corresponding interval of time from the time duration, the historical data pattern model being obtained from the target data and the data anomaly cluster including outlier data from the target data 1116

Implementing the second cognitive learning operation to update the data threshold value based on the data accommodation model and the data anomaly cluster corresponding to each of the plurality of data wedges 1118

Implementing the second cognitive learning operation to generate a data anomaly detection result corresponding to the data anomaly detection requirement, the data anomaly detection result comprising the data accommodation model and the data anomaly cluster relevant for resolution to the query 1120

Implementing the second cognitive learning operation to initiate anomaly detection on the target data to resolve the query based on the data anomaly detection result 1122

*FIG. 11B*

AUTO REINFORCED ANOMALY DETECTION

BACKGROUND

The importance of enterprise data management has increased significantly in recent times. Presently available tools that automatically identify anomalies from available data might not provide an accurate outcome. For example, such tools may report false positives as anomalies, which may lead to the implementation of inappropriate rectification measures. Currently, the existing techniques of identifying anomalies in data may involve a comparison of current data against data collected in the past for an entire span of time and detecting discrepancies in the data. Such an approach may be devoid of any context for the data and the anomalies identified may not be accurate.

A traditional approach for data anomaly detection may include data cleaning and maintenance, identification and application of an algorithm, and reporting data anomalies. However, such approaches do not check the integrity of the data that may be received for analysis. If the integrity of data is not checked it may lead to gaps and, therefore, incorrect insights may be inferred resulting in inappropriate decisions being implemented.

Therefore, to ensure effectiveness, efficiency and completeness both qualitatively and quantitatively, a data anomaly detection system may be required to understand a data trend, identify proper anomalies, and reinforce learning from anomalies detected to automatically update the data trend to solve issues related to anomaly detection on a real-time basis. In addition, there is a requirement fora system to reduce manual analysis required for checking data integrity and also reduce the time needed to detect outlier data from the data trends.

Accordingly, a technical problem with the currently available systems for data anomaly detection is that they may be inefficient and/or inaccurate. There is a need for a data anomaly detection system that may account for the various factors mentioned above, amongst others, to predict the anomalies in data and verify whether the system may have correct data for analysis in an efficient and accurate manner.

BRIEF DESCRIPTION OF DRAWINGS

FIGS. 7A-7D illustrate a pictorial representation of a use case for calculation of a data probity score for data anomaly detection using a data anomaly detection system, according to an example embodiment of the present disclosure.

FIGS. 8A-8D illustrate a pictorial representation of an output from an algorithm deployed by a data anomaly detection system for data anomaly detection, according to an example embodiment of the present disclosure.

FIGS. 11A and 11B illustrate a process flowchart for anomaly detection using a data anomaly detection system, according to an example embodiment of the present disclosure.

DETAILED DESCRIPTION

Figure 1:
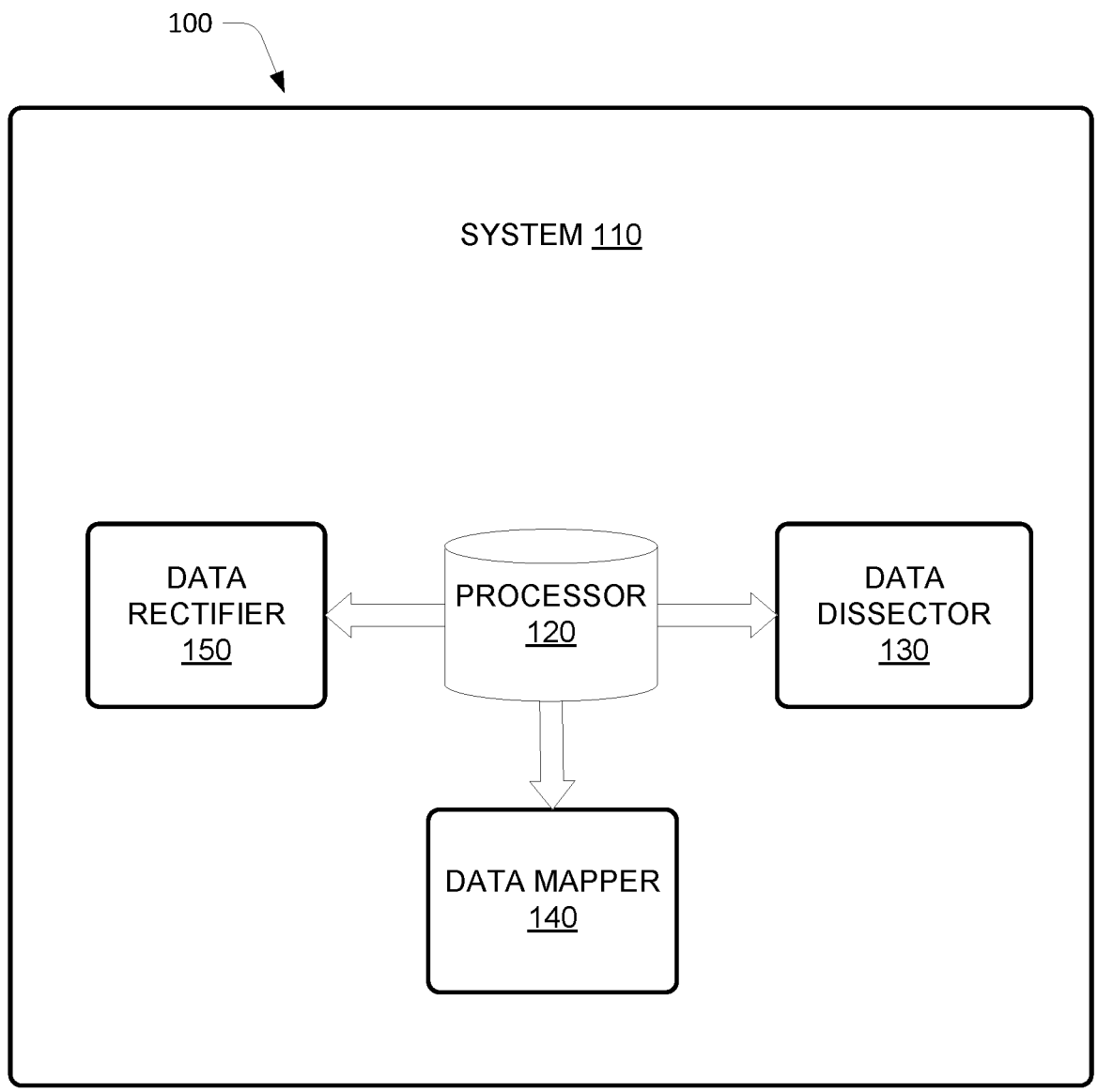
FIG. 1 illustrates a diagram for a data anomaly detection system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes a system and method for process optimization including a Data Anomaly Detection System (DADS). The data anomaly detection system (referred to as "system" hereinafter) may be used to understand and update a data trend to identify data anomalies automatically. The data anomalies may be referred to as data points in a dataset, which may not conform to an expected pattern of the other items in the data set. A dataset may be a mixture of multiple data distribution patterns. The data anomaly may signal a change in underlying conditions that may govern a dataset. Data anomaly detection may refer to the problem of finding patterns in data that do not conform to expected behavior. The importance of anomaly detection may be paramount because the data anomalies in a data set may translate to significant and often critical actionable information in a wide variety of application domains. The system presented herein may validate data probity before executing data anomaly detection. For the purpose of this disclosure, data probity may refer to the accuracy and consistency of the data. The system may only consider data that may be upright and have a complete structure. For the purpose of the present disclosure, the term "uprightness" may refer to presence of a minimum number of features associated with a dataset. For example, if for a particular process the minimum number of features may include a data host, a time period, and a utilization of data during the time period, then if one of the features may be absent, the dataset may not be complete and may not be considered upright. In an example, the data set may include a time context based feature, wherein a minimum time period of for example, 6 months may be required for effective data training. The system may consider only the datasets associated with the minimum time period of 6 months to be complete and upright in such an example, and therefore be considered for further analysis.

The system may include a processor, a data dissector, a data mapper and a data rectifier. The processor may be coupled to the data dissector, the data mapper and the data rectifier. The data dissector may obtain a query from a user. The query may indicate a data anomaly detection requirement. The data dissector may obtain target data from a plurality of data sources associated with the data anomaly detection requirement. The data dissector may implement an artificial intelligence component to sort the target data into a plurality of data wedges. Each data wedge may comprise a plurality of events. Each event may comprise a portion of the target data obtained over a time duration identified by the artificial intelligence component. The data dissector may create a data pattern model for each of the plurality of data wedges. The data pattern model may comprise each of the plurality of events associated with a data wedge from the plurality of data wedges for a specific interval of time from the time duration.

The data mapper may implement a first cognitive learning operation to identify a data threshold value for each of the plurality of events from the target data. The data threshold value may be indicative of data probity. For purposes of this disclosure, data probity means accuracy and consistency of the data. The system may only consider data that may be upright and have a complete structure. The data mapper may implement the first cognitive learning operation to determine a data probity score for each of the plurality of events based on mapping the data pattern model with the data threshold value. The data mapper may implement the first cognitive learning operation to create a data probity index for the data pattern model associated with each of the plurality of data wedge. The data probity index may comprise the plurality of events associated with the data pattern model according to their respective data probity scores.

The data rectifier may implement a second cognitive learning operation to identify a data anomaly cluster for each data pattern model based on mapping the data probity index for the data pattern model with the data probity index for a corresponding interval of time from the time duration. The historical data pattern model may be obtained from the target data and the data anomaly cluster may include outlier data from the target data. The data rectifier may implement the second cognitive learning operation to update the data threshold value based on the data anomaly cluster corresponding to each of the plurality of data wedges. The data rectifier may implement the second cognitive learning operation to generate a data anomaly detection result corresponding to the data anomaly detection requirement. The data anomaly detection result may comprise the data pattern model for a data wedge from the plurality of data wedges deficient of the data anomaly cluster relevant for the resolution to the query. The data rectifier may implement the second cognitive learning operation to initiate anomaly detection on the target data to resolve the query based on the data anomaly detection result.

The embodiments for the data anomaly detection requirement presented herein are exemplary in nature and should be treated as such. For the sake of brevity and technical clarity, the description of the data anomaly detection system may be restricted to few exemplary embodiments, however, to a person of ordinary skill in the art, it should be clear that the system may be used for the fulfillment of various data anomaly detection requirements other than those mentioned hereinafter.

Accordingly, the present disclosure aims to provide a system for data anomaly detection that may account for the various factors mentioned above, amongst others, to detect data anomalies that may be affecting a process in an efficient and accurate manner. Furthermore, the present disclosure may categorically analyze various parameters to understand a data trend, identify right anomalies and reinforce the learning from anomalies detected to automatically update the data trend to solve the problem of anomaly detection on a real-time basis in an efficient and accurate manner.

FIG. 1 illustrates a system 110 for process optimization (referred to as system 110 hereinafter), according to an example implementation of the present disclosure. In an example, the system 110 may include a processor 120. The processor 120 may be coupled to the data dissector 130, the data mapper 140, and the data rectifier 150.

The data dissector 130 may obtain a query from a user. The query may indicate a data anomaly detection requirement. The data anomaly detection requirement may be relevant to identifying anomalies in a data set. The data anomaly detection requirement may include checking the integrity, accuracy, and consistency of a data set. In an example, the data anomaly detection requirement may be associated with at least one of a process, an organization, and an industry relevant for data anomaly detection and data assessment operations. The data anomaly detection requirement may include updating a dataset with respect to anomalies detected. The data anomaly detection requirement may include ascertaining if anomalies detected by the system 110 may be included in the dataset. The data anomaly detection requirement may be related to various data assessment operations such as validating a data set for accuracy, migrating a dataset on to a cloud platform, identification and elimination of non-actionable data inferences, and the like. The data anomaly detection requirement may be related to generating key insights from data related to an organization in a corrigible manner. The embodiments for the data anomaly detection requirement presented herein may be exemplary in nature and a person skilled in the art must understand that the data anomaly detection requirement may include any operation related to assessment and evaluation of a data set. The system 110 may be a data assessment platform, which may allow a user to create, document, publish, manage and monitor data assessment in a secure environment.

The data dissector 130 may obtain target data from a plurality of data sources associated with the data anomaly detection requirement. The target data may be the data set mentioned above. In accordance with various embodiments of the present disclosure, the data set may include data related to any of the operations associated with an organization. In an example, the system 110 may obtain the target data on a real-time basis. In an example, the target data may be a set of historical data stored in the system 110, which may be accessed by the system 110 for processing the data anomaly detection requirement. The plurality of data sources may include various data platforms across the Internet, various cloud platforms maintained by an organization, a new database acquired by an organization, a new update for an existing data platform, and the like. In accordance with an embodiment of the present disclosure, the plurality of data sources may include various datasets across from news articles, various datasets maintained by various external organizations, various internal datasets comprising historical data that may be maintained by an organization.

The data dissector 130 may implement an artificial intelligence component to sort the target data into a plurality of data wedges. The artificial intelligence component may be one of a data extractor, a data classifier, a data associator, a data comparer, a relationship extractor, and a dependency parser and the like. In an example, the artificial intelligence component may include an intelligent machine learning module that may help to resolve the query. The artificial intelligence component may include the implementation of a time metrics based data wedging technique, wherein the target data may be divided into the plurality of data wedges by dividing the target data based on a twenty-four hour time interval. An exemplary implementation of the data wedging technique may be presented herein: In an example, the data dissector 130 may collect target data for every hour at an interval of 5-minutes. The target data may be collected in the following format:

| Server_name | Time_period | Memory_utilization | CPU_Utilization |
| --- | --- | --- | --- |

In an example, the target data collected for each hour may be represented in the following format:

| ta_period | avgMemoryUtil | avgCPUUtil |
| --- | --- | --- |
| 6/1/2019 0:00 | 99 | 100 |
| 6/1/2019 0:05 | | |
| 6/1/2019 0:10 | 98 | |
| 6/1/2019 0:15 | 98 | |
| 6/1/2019 0:20 | | |
| 6/1/2019 0:25 | | |
| 6/1/2019 0:30 | | 100 |
| 6/1/2019 0:35 | | 28 |
| 6/1/2019 0:40 | | 100 |
| 6/1/2019 0:45 | | |
| 6/1/2019 0:50 | | 100 |
| 6/1/2019 0:55 | | |

The artificial intelligence component may collate the target data collected for 7 days of a week and create a new list of target data according to a day from the week. For example, the data dissector 130 may create a list named "0" for Monday, a list named "1" for Tuesday, a list named "2" for Wednesday, a list named "3" for Thursday, a list named "4" for Friday, a list named "5" for Saturday, and a list named "6" for Sunday. The data dissector 130 may consider each of the lists "0", "1", "2", "3", "4", "5", and "6" as a main list. The data dissector 130 may divide each of the main lists into for example, a set of twenty-four directories. In an example, the data dissector 130 may implement Python® codes for the implementation of the artificial intelligence component. The plurality of data wedges may include the set of twenty-four directories as shown above according to each hour, wherein the target data may be collected for every five minute time interval. In an example, each value from the target data after the implementation of the artificial intelligence component may be represented as: [{6/1/2019: data}]—A main list (Day) enclosing 24 dictionaries (Hours of the day).

For the sake brevity and technical clarity, only one time-metric based technique for generation of the plurality of data wedges has been presented herein, however, it should be clear to a person skilled in the art that the data dissector 130 may implement any time metric based technique over the target data to generate the plurality of data wedges. This may a continuous process and enrich the target data. In accordance with various embodiments of the present disclosure, the data dissector 130 may obtain the target data on a real-time basis from the plurality of data sources. The data dissector 130 may implement the artificial intelligence component on the target data obtained in a real-time basis for creating the plurality of data wedges.

The plurality of data wedges may refer to the target data diced by the implementation of the artificial intelligence component into various blocks of information. Each data wedge may comprise a plurality of events. The plurality of events may include a measurable factor, which may be forming one of a set that may define a condition for processing the data anomaly detection requirement. Each event may comprise a portion of the target data obtained over a time duration identified by the artificial intelligence component. For example, the plurality of events may various data related to logs, metrics, service management data, data occurrence, and the like. In an example, the time duration may include twenty-four hours of a day. In an example, each of the plurality of events may be data points include in the target data that may be measured to indicate the accuracy of the target data. In accordance with various embodiments of the present disclosure, the data points may correspond to a measurable factor, for example, a memory utilization of a server at a given time.

The data dissector 130 may create a data pattern model for each of the plurality of data wedges. The data pattern model may comprise each of the plurality of events associated with a data wedge from the plurality of data wedges for a specific interval of time from the time duration. For example, the specific interval of time may be a one (1) hour time interval. The plurality of data wedges may include blocks of target data collected specific interval of time from the time duration. The data pattern model may include the plurality of events associated with a data wedge from the plurality of data wedges segregated over an hourly basis. The data pattern model may correspond to the target data collected over a specific time period such as a particular hour from the time duration of twenty-four (24) hours of a day. The data dissector 130 may implement the artificial intelligence component and segregate the target data into the plurality of data wedges. The data dissector 130 may determine the number of the plurality of data wedges based on the specific interval of time from the time duration. For example, the artificial intelligence component may identify the time duration to be twenty-four (24) hours and the specific time interval to be one hour, then the number of the plurality of data wedges may be twenty-four (24). Each of the data wedge from the plurality of data wedges may include the plurality of events as mentioned above. In an example, each data wedge from the plurality of data wedges may include the plurality of events that may have been obtained over for example, a one-hour time interval. In accordance with various embodiments of the present disclosure, the time duration may be a unit of time for example, a second, a minute, an hour, a day, a week, a month, and the like. In accordance with various embodiments of the present disclosure, the specific interval of time may be a unit of time, for example, a second, a minute, an hour, a day, a week, a month, and the like. The artificial intelligence component may identify the time duration and the specific interval of time-based on input from the user to the system 110. In an example, the system may be configurable such that the artificial intelligence component may automatically identify the time duration and the specific interval of time.

The data mapper 140 may implement a first cognitive learning operation to identify a data threshold value for each of the plurality of events from the target data. The data threshold value may be indicative of data probity. In accordance with various embodiments of the present disclosure, the first cognitive learning operation may be a schema for a rectitude analysis of the target data that may be designed to ensure a factor of data quality may be an indexing medium for processing the data anomaly detection requirement. In accordance with various embodiments of the present disclosure, the term "rectitude analysis" may refer to a process for analysis of data for uprightness and correctness. In accordance with various embodiments of the present disclosure, the term correctness may refer to the target data with data probity above the data threshold value. For the purpose of the present disclosure, the term "correctness" of data may be based on the data probity score, and may be indicative of a percentage in reduction of "false positive" events in the target data. The term "correctness" may be used herein to improve the trend generated with respect to pattern behavior. For example, the first cognitive learning operation may be implemented to ensure accurate target data may be taken up for resolving the data anomaly detection requirement. In accordance with various embodiments of the present disclosure, the first cognitive learning operation may include the implementation of a latitude data index algorithm (explained in detail by way of subsequent Figs). The first cognitive learning operation may identify the data threshold value based on the implementation of the first cognitive learning operation. The data threshold value may be indicative of data probity. The data threshold value may define a benchmark for indicating the quality of target data included in the plurality of events for each of the plurality of data wedges. For example, an event from the plurality of events that may fall below the data threshold value, then the system 110 may identify such an event as a data anomaly to be used for resolving the query. The events that may be identified as a data anomaly may be analyzed further to check if the aforementioned events may be true incidents of a data anomaly or may have been falsely marked as a data anomaly. In an example, the data threshold value may be determined through the implementation of the latitude data index algorithm (explained in detail by way of FIG. 4). The data mapper 140 may identify an upper data limit and a lower data limit from the data threshold value. The upper data limit and a lower data limit may be used to measure data quality. As mentioned above, each of the plurality of events may be measurable factors from each of the plurality of data wedges. The system 110 may only consider the plurality of events that may correspond to a value that may be measured between the upper data limit and the lower data limit of the data threshold value. The upper data limit and the lower data limit may be determined from the data threshold value (explained in detail by way of FIG. 4).

In accordance with various embodiments of the present disclosure, the threshold value may be determined by calculating a mean count of the associated plurality of events. The upper data limit may be indicative of for example, a 10% increment in the mean count associated with the data threshold value. The lower data limit may be indicative of for example, a 10% decrease in the mean count associated with the data threshold value. In an example, the time duration may be twenty-four (24) hours and the specific interval of time may be one (1) hour. The data dissector 130 may sort the target data according to the time duration of twenty-four (24) hours into the plurality of data wedges including the plurality of events segregated on an hourly basis. The data mapper 140 may compare values corresponding to the plurality of events against a previous time duration day and the same interval of time. For example, the data mapper 140 may compare the plurality of events for a particular hour with the plurality of events from any hour from the historical data. In an example, the data mapper 140 may compare a value corresponding to the plurality of events for a particular hour with a value corresponding to the plurality of events from any hour from the historical data. The data mapper 140 may calculate a mean count of the plurality of events for each of the plurality of data wedges. In an example, the data mapper 140 may compare the mean count of the plurality of events for a particular hour with the mean count for the plurality of events from any hour from the historical data. The data mapper 140 may further include calculating a value that may be higher than the mean count. For example, the data mapper 140 may further include calculating a value that may be ten percent (10%) higher than the mean count. The data mapper 140 may further include calculating a value that may be lower than the mean count. For example, the data mapper 140 may further include calculating a value that may be ten percent (10%) lower than the mean count. The mean count may be referred to as the data threshold value. The mean count calculation presented above for determination of the data threshold value, may be implemented using Splunk® platform. The data mapper 140 may deploy any tool, technique or platform for calculating the data threshold value.

The data mapper 140 may implement the first cognitive learning operation to determine a data probity score for each of the plurality of events based on mapping the data pattern model with the data threshold value. As mentioned above, the data threshold value, the upper data limit and the lower data limit may be indicative of data probity. Also, the data pattern model may include the plurality of events for a specific interval of time. The data mapper 140 may compare each of the plurality of events from the data pattern model with the data threshold value. In accordance with various embodiments of the present disclosure, the data mapper 140 may implement the latitude data index algorithm to allocate the data probity score to the plurality of events. In an example, the data mapper 140 may compare a count value for each of the plurality of events with the upper data limit, and the lower data limit. The data mapper 140 may mark the plurality of events that may breach the upper data limit, and the lower data limit. The data mapper 140 may compare the marked plurality of events against the same specific interval of time from a different time duration, such as a previous week. For example, the marked events from a "Monday 10.00 AM-11.00 AM" from a week "A" may be compared with a "Monday 10.00 AM-11.00 AM" from a week "B", wherein the week "B" may be any week prior to week "A". The data mapper 140 may implement the first cognitive learning operation to calculate a percentage by comparing marked events from against the actual day to allocate the data probity score. The data probity score may correspond to the accurateness, quality, and completeness of the target data included within the associated plurality of events.

In accordance with various embodiments of the present disclosure, the determination of the data probity score includes a data probity check. The data probity check may be implemented using the Latitude Data Index (LDI) algorithm. The LDI algorithm may be used to remove noise/anomalies from the plurality of events. In an example, the plurality of events collected from the target data may be sliced on a twenty-four (24) hour basis for each day of a week. A time-series prediction may be deployed to recognize the pattern in the plurality of events. The data probity check implemented on the plurality of events for a specific interval of time for example, a specific hour of day may include an inter-probity check and an intra-probity check. The inter-probity check may check for data anomalies by comparing the plurality of events from a data wedge with historical target data (explained below).

The intra-probity check may check for data anomalies for the time duration associated with the specific interval of time. For example, the intra-probity check may include checking the data quality amongst the plurality of wedges sliced from target data obtained for a particular time duration, such as twenty-four (24) hours. The data mapper 140 may distribute the target data associated with the plurality of events for a data wedge from the plurality of data wedges normally and sort it accordance with the data probity score. The LDI algorithm may calculate a target data length and cut the data based on a series of latitude points to get the first quarter index of the data. In an example, the target data length may be the target data collected for the time duration for example, twenty-four (24) hours. In an example, the latitude points may be the specific interval of time from the time duration. For example, if the specific interval of time may be one-hour, the latitude points may be "10.00 AM", "11.00 AM", "12.00 Noon", "01.00 PM" and the like. The LDI algorithm may identify a latitude index value based on variation in the data length. In an example, the latitude index value may be pre-defined into the system 110 corresponding to a data length. The intra-probity check may include calculating a first latitude index by dividing the data length with the latitude index value. The first latitude index may be a trend of the target data for a specific time period from the time duration. For example, the first latitude index may be a trend of the target data for the first 12 hours from the twenty-four (24) hour time duration. The intra-probity check may further calculate a second latitude index by subtracting the first latitude index from the data length. The second latitude index may be a trend of the target data for a time period from the time duration that may be different from the time period for the first latitude index. For example, the second latitude index may be a trend of the target data for the last 12 hours from the twenty-four (24) hour time duration. The intra-probity check may further include calculating a latitude data index value by subtracting the second latitude index from the first latitude index. The intra-probity check may further include calculating maxima by determining a product of the latitude data index value and the data threshold value and adding the second latitude index to the same. The maxima may correspond to the upper data limit described above. The plurality of events breaching the maxima may be detected by the data mapper 140 as data anomalies.

The data mapper 140 may implement the first cognitive learning operation to create a data probity index for the data pattern model associated with each of the plurality of data wedge. The data probity index may comprise the plurality of events associated with the data pattern model arranged according to their respective data probity scores. As mentioned above, the data mapper 140 may allocate the data probity score to the plurality of events that may be measured to fall above the data threshold value. The data probity index may include the plurality of events from a data wedge from the plurality of data wedges that may be arranged in a sequential manner corresponding to the data probity score for each of the plurality of events. For example, the data probity index may include the plurality of events for a particular hour of a day arranged according to the data probity score allotted to each of the plurality of events.

The data rectifier 150 may implement a second cognitive learning operation to identify a data anomaly cluster for each data pattern model based on mapping the data probity index for the data pattern model with the data probity index for a historical data pattern model for a corresponding interval of time from the time duration. The historical data pattern model may be obtained from the target data. For example, the data rectifier 150 may compare the data probity index for the plurality of events associated with a particular hour from a day of a week with the data probity index for the plurality of events associated with the same hour from the same day from a different week such as a week prior to the week mentioned above. The data rectifier 150 may identify the data anomaly cluster based on the aforementioned comparison. The inter probity check mentioned above may include the aforementioned comparison. The data rectifier 150 may identify differences between the data probity index for the data pattern model and the data probity index for the historical data pattern model. In accordance with various embodiments of the present disclosure, the data mapper 140 may implement a profiling and segregation algorithm as part of the second cognitive learning operation to identify the data anomaly cluster. As mentioned above, the first cognitive learning operation may mark the data points that may be breaching the data threshold value. The data points that may breach the data threshold value may be analyzed further to check if the data points breeching the data threshold value may be true incidents of a data anomaly or may have been falsely marked as a data anomaly. The data points that may be found to breech the data threshold value after the aforementioned check may be referred to as data outliers. The profiling and segregation algorithm may measure the distance of the identified outliers from their counterparts based on the profiling formula:

$$x_i - x_{i+1}$$

wherein, $x_i$ may represent each data point. In an example, each data point may correspond to memory utilization in an hour (as mentioned above). Each data point for memory utilization may be compared with each other data point for the given specific interval of time, for example, a given hour. The memory utilization data may be arranged in an ascending order based on the differences, wherein points that may be closer to each other may be grouped in one cluster, for example, a range up to 10 units. The aforementioned comparison may be segregated and profiled into low, medium and high values based on memory utilization. For example, lesser utilized data points may be profiled into a low cluster, higher utilization data points may be profiled into a high cluster and medium utilization data points may be profiled into a medium cluster. The values in the high cluster may be compared with the low cluster and the medium cluster and checked for the differences. In an example, rare events wherein there may be a sudden peak in data points that may occur occasionally. The system 110 may analyze the presence of such rare events and if they persist, the data rectifier 150 may update them into data trends of a server and it may not be reported as a data anomaly. The results of the aforementioned comparison and analysis of the rare events may be propagated back to the algorithm as reinforced learning and a value for the data threshold value may be set automatically so that the anomalies are identified accordingly in the future. The profiling and segregation may analyze a trend of memory utilization of the server for a particular hour. The data anomaly cluster may include outlier data from the target data. The data rectifier 150 may identify the data anomalies within the data pattern model for a data wedge from the plurality of data wedges.

The data rectifier 150 may implement the second cognitive learning operation to establish a data accommodation model corresponding to each of the plurality of data wedges. The data accommodation model may comprise an associated data pattern model for a data wedge from the plurality of data wedges deficient of the data anomaly cluster. The data rectifier 150 may remove the outlier data as identified by the data anomaly cluster from the data pattern model for the specific interval of time for each of the plurality of data wedges. The data rectifier 150 may remove the data anomaly cluster from the data pattern model to form the data accommodation model. The data accommodation may include target data devoid of data anomalies. The data rectifier 150 may implement the second cognitive learning operation to update the data threshold value based on the data accommodation model and the data anomaly cluster corresponding to each of the plurality of data wedges. As mentioned above, the system 110 may analyze the rare events and update the data trends based on the persistence of rare events in a data pattern model for a particular specific interval of time. The system 110 may update the data trends by updating the data threshold value. As mentioned above, the system 110 may detect the data anomalies based on the data threshold value, by only considering the plurality of events (data points) that may fall within the upper data limit and the lower data limit of the data threshold value.

In accordance with various embodiments of the present disclosure, the data rectifier 150 may further determine a data accommodation index indicative of a level of data anomaly detection achieved in at least a part of the target data through the implementation of the artificial intelligence component, the first cognitive learning operation, and the second cognitive operation. The data accommodation index may include a conglomerate of the data accommodation model for each of the plurality of wedges. The data accommodation index may include a conglomerate of the data anomaly cluster for each of the plurality of wedges. For example, as mentioned above, the data accommodation model may be may comprise an associated data pattern model for a data wedge from the plurality of data wedges deficient of the data anomaly cluster. The data accommodation index may comprise a collated set of the data accommodation model and a collated set of the data anomaly cluster for each of the plurality of data wedges for the time duration. For example, the data accommodation index for a day may include all the data anomalies detected during a twenty-four (24) hour time period. The data accommodation index for a day may include all the data accommodation models created during the twenty-four (24) hour time period. The system 110 may calculate a level of data anomaly detection by comparing the collated set of the data accommodation model with the collated set of the data anomaly cluster for each of the plurality of data wedges for the time duration.

The data rectifier 150 may establish an anomaly library, by associating the data anomaly cluster and the data accommodation model for the time duration identified by the artificial intelligence component with a data anomaly detection requirement. The system 110 may deploy the anomaly library for validation of the data anomaly cluster. The system may associate data trends present in the data accommodation model with data points that may be identified within the data anomaly cluster. The 110 may store the results from the aforementioned mapping and deploy them for processing a future data anomaly detection requirement.

The data rectifier 150 may implement the second cognitive learning operation to generate a data anomaly detection result corresponding to the data anomaly detection requirement. The data anomaly detection result may comprise the data pattern model for a data wedge from the plurality of data wedges deficient of the data anomaly cluster relevant for resolution to the query. The data anomaly detection result may comprise the data accommodation model and the data anomaly cluster relevant for the resolution to the query (explained further by the way of subsequent Figs.). In accordance with various embodiments of the present disclosure, the data rectifier 150 may obtain a user input to implement the data anomaly detection result. In accordance with various embodiments of the present disclosure, the data rectifier 150 may update the target data based on an update in the data anomaly detection result, the data accommodation model and the data anomaly cluster. The data rectifier 150 may implement the second cognitive learning operation to initiate anomaly detection on the target data to resolve the query based on the data anomaly detection result. In an example, the data rectifier 150 may require a user input to initiate anomaly detection of the target data to resolve the data anomaly detection requirement based on the data anomaly detection result. In another example, the data rectifier 150 may automatically initiate anomaly detection of the target data to resolve the data anomaly detection requirement based on the data anomaly detection result. The system 110 may be configurable to perform anomaly detection on the target data automatically and/or based on user input.

Figure 2:
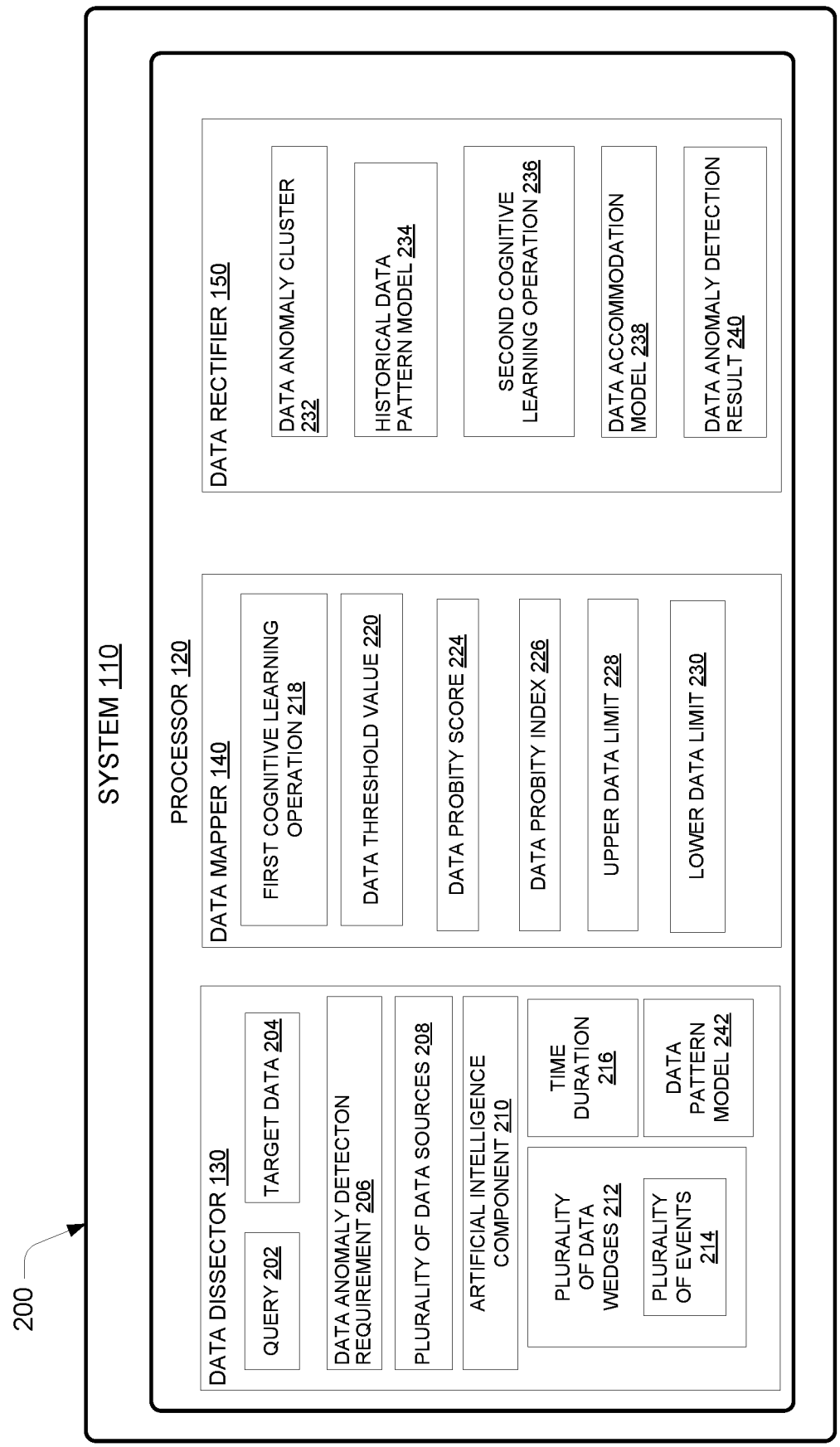
FIG. 2 illustrates various components of a data anomaly detection system, according to an example embodiment of the present disclosure.

FIG. 2 illustrates various components of the data anomaly detection system 110, according to an example embodiment of the present disclosure. In an example, the system 110 may include a processor 120. The processor 120 may be coupled to the data dissector 130, the data mapper 140 and the data rectifier 150.

The data dissector 130 may obtain a query 202 from a user. The query 202 may indicate a data anomaly detection requirement 206. The data anomaly detection requirement 206 may be relevant to identifying anomalies in a data set. The data anomaly detection requirement 206 may include checking the integrity, accuracy, and consistency of a data set. In an example, the data anomaly detection requirement 206 may be associated with at least one of a process, an organization, and an industry-relevant for data anomaly detection and data assessment operations. The data anomaly detection requirement 206 may include updating a dataset with respect to anomalies detected. The data anomaly detection requirement 206 may include ascertaining if anomalies detected by the system 110 may be updated into the dataset. The data anomaly detection requirement 206 may be related to various data assessment operations such as validating a data set for accuracy, migrating a dataset on to a cloud platform, identification and elimination of non-actionable data inferences, and the like. The data anomaly detection requirement 206 may be related to generating key insights from data related to an organization in a corrigible manner. The embodiments for the data anomaly detection requirement 206 presented herein may be exemplary in nature and a person skilled in the art must understand that the data anomaly detection requirement 206 may include any operation related to assessment and evaluation of a data set. The system 110 may be a data assessment platform, which may allow a user to create, document, publish, manage and monitor data assessment in a secure environment.

The data dissector 130 may obtain target data 204 from a plurality of data sources 208 associated with the data anomaly detection requirement 206. The target data 204 may be the data set mentioned above. In accordance with various embodiments of the present disclosure, the data set may include data related to any of the operations associated with an organization. In an example, the system 110 may obtain the target data 204 on a real-time basis. In an example, the target data 204 may be a set of historical data stored in the system 110, which may be accessed by the system 110 for processing the data anomaly detection requirement 206. The plurality of data sources 208 may include various data platforms across the Internet, various cloud platforms maintained by an organization, a new database acquired by an organization, a new update for an existing data platform, and the like. In accordance with an embodiment of the present disclosure, the plurality of data sources 208 may include various datasets across from news articles, various datasets maintained by various external organizations, various internal datasets comprising historical data that may be maintained by an organization.

The data dissector 130 may implement an artificial intelligence component 210 to sort the target data 204 into a plurality of data wedges 212. The artificial intelligence component 210 may be one of a data extractor, a data classifier, a data associator, a data comparer, a relationship extractor, and a dependency parser and the like. In an example, the artificial intelligence component 210 may include an intelligent machine learning module that may help to resolve the query 202 This may a continuous process and enrich the target data 204. In accordance with various embodiments of the present disclosure, the data dissector 130 may obtain the target data 204 on a real-time basis from the plurality of data sources 208. The data dissector 130 may implement the artificial intelligence component 210 on the target data 204 obtained in a real-time basis for creating the plurality of data wedges 212.

The plurality of data wedges 212 may refer to the target data 204 diced by the implementation of the artificial intelligence component 210 into various blocks of information. Each data wedge may comprise a plurality of events 214. The plurality of events 214 may include a measurable factor, which may be forming one of a set that may define a condition for processing the data anomaly detection requirement 206. Each event may comprise a portion of the target data 204 obtained over a time duration 216 identified by the artificial intelligence component 210. For example, the plurality of events 214 may various data related to logs, metrics, service management data, data occurrence, and the like. In an example, the time duration 216 may include twenty-four hours of a day. In an example, each of the plurality of events 214 may be data points include in the target data 204 that may be measured to indicate the accuracy of the target data 204. In accordance with various embodiments of the present disclosure, the data points may correspond to a measurable factor for example, a memory utilization of a server at a given time.

The data dissector 130 may create a data pattern model 242 for each of the plurality of data wedges 212. The data pattern model 242 may comprise each of the plurality of events 214 associated with a data wedge from the plurality of data wedges 212 fora specific interval of time from the time duration 216. For example, the specific interval of time may be a one (1) hour time interval. The plurality of data wedges 212 may include blocks of target data 204 collected specific interval of time from the time duration 216. The data pattern model 242 may include the plurality of events 214 associated with a data wedge from the plurality of data wedges 212 segregated over an hourly basis. The data pattern model 242 may correspond to the target data 204 collected over a specific time period such as a particular hour from the time duration 216 of twenty-four (24) hours of a day. The data dissector 130 may implement the artificial intelligence component 210 and segregate the target data 204 into the plurality of data wedges 212. The data dissector 130 may determine the number of the plurality of data wedges 212 based on the specific interval of time from the time duration 216. For example, the artificial intelligence component 210 may identify the time duration 216 to be twenty-four (24) hours and the specific time interval to be one hour, then the number of the plurality of data wedges 212 may be twenty-four (24). Each of the data wedge from the plurality of data wedges 212 may include the plurality of events 214 as mentioned above. In an example, each data wedge from the plurality of data wedges 212 may include the plurality of events 214 that may have been obtained over for example, a one-hour time interval. In accordance with various embodiments of the present disclosure, the time duration 216 may be a unit of time for example, a second, a minute, an hour, a day, a week, a month, and the like. In accordance with various embodiments of the present disclosure, the specific interval of time may be a unit of time for example, a second, a minute, an hour, a day, a week, a month, and the like. The artificial intelligence component 210 may identify the time duration 216 and the specific interval of time-based on input from the user to the system 110. In an example, the system may be configurable such that the artificial intelligence component 210 may automatically identify the time duration 216 and the specific interval of time.

The data mapper 140 may implement a first cognitive learning operation 218 to identify a data threshold value 220 for each of the plurality of events 214 from the target data 204. The data threshold value 220 may be indicative of data probity. In accordance with various embodiments of the present disclosure, the first cognitive learning operation 218 may be a schema for a rectitude analysis of the target data 204 that may be designed to ensure a factor of data quality may be an indexing medium for processing the data anomaly detection requirement 206. For example, the first cognitive learning operation 218 may be implemented to ensure accurate target data 204 may be taken up for resolving the data anomaly detection requirement 206. In accordance with various embodiments of the present disclosure, the first cognitive learning operation 218 may include the implementation of a latitude data index algorithm (explained in detail by way of subsequent Figs). The first cognitive learning operation 218 may identify the data threshold value 220 based on the implementation of the first cognitive learning operation 218. The data threshold value 220 may be indicative of data probity. The data threshold value 220 may define a benchmark for indicating the quality of target data 204 included in the plurality of events 214 for each of the plurality of data wedges 212. For example, an event from the plurality of events 214 that may fall below the data threshold value 220, then the system 110 may remove such an event from the target data 204 to be used for resolving the query 202. In an example, the data threshold value 220 may be determined through the implementation of the latitude data index algorithm (explained in detail by way of FIG. 4). In accordance with various embodiments of the present disclosure, the data mapper 140 may identify an upper data limit 228 and a lower data limit 230 from the target data 204. The upper data limit 228 may comprise the highest threshold value of an event from the plurality of events 214 and the lower data limit 230 may comprise a lowest threshold value of an event from the plurality of events 214 (explained in detail by way of FIG. 4). The upper data limit 228 and the lower data limit 230 may be used to measure data quality. As mentioned above, each of the plurality of events 214 may be measurable factors from each of the plurality of data wedges 212. The system 110 may only consider the plurality of events 214 that may correspond to a value that may be measured between the upper data limit 228 and the lower data limit 230. The data threshold value 220 may fall within the upper data limit 228 and the lower data limit 230 (explained in detail by way of FIG. 4).

In accordance with various embodiments of the present disclosure, the threshold value, the upper limit and the lower limit may be determined by calculating a mean count of the associated plurality of events 214. In an example, the time duration 216 may be twenty-four (24) hours and the specific interval of time may be 1-hour. The data dissector 130 may sort the target data 204 according to the time duration 216 of twenty-four (24) hours into the plurality of data wedges 212 including the plurality of events 214 segregated on an hourly basis. The data mapper 140 may compare values corresponding to the plurality of events 214 for against a previous time duration 216 days and the same interval of time. For example, system 110 may compare the plurality of events 214 for a particular hour with the plurality of events 214 from any hour from the historical data. In an example, the system 110 may compare a value corresponding to the plurality of events 214 for a particular hour with a value corresponding to the plurality of events 214 from any hour from the historical data. The data mapper 140 may calculate a mean count of the plurality of events 214 for each of the plurality of data wedges 212. In an example, the data mapper 140 may compare the mean count of the plurality of events 214 for a particular hour with the mean count for the plurality of events 214 from any hour from the historical data. The data mapper 140 may further include calculating a value that may be higher than the mean count. For example, the data mapper 140 may further include calculating a value that may be ten percent (10%) higher than the mean count. The data mapper 140 may further include calculating a value that may be lower than the mean count. For example, the data mapper 140 may further include calculating a value that may be ten percent (10%) lower than the mean count. The mean count may be referred to as the data threshold value 220, the value higher than the mean count may be referred to as the upper data limit 228 and the value lower than the mean count may be referred to as the lower data limit 230. The upper data limit 228 and the lower data limit 230 may be parts of the data threshold value.

The data mapper 140 may implement the first cognitive learning operation 218 to determine a data probity score 224 for each of the plurality of events 214 based on mapping the data pattern model 242 with the data threshold value 220. As mentioned above, the data threshold value 220, the upper data limit 228 and the lower data limit 230 may be indicative of data probity. Also, the data pattern model 242 may include the plurality of events 214 for a specific interval of time. The data mapper 140 may compare each of the plurality of events 214 from the data pattern model 242 with the data threshold value 220. In accordance with various embodiments of the present disclosure, the data mapper 140 may implement the latitude data index algorithm to allocate the data probity score 224 to the plurality of events 214. In an example, the data mapper 140 may compare a count value for each of the plurality of events 214 with the upper data limit 228, and the lower data limit 230. The data mapper 140 may mark the plurality of events 214 that may breach the upper data limit 228, and the lower data limit 230. The data mapper 140 may compare the marked plurality of events 214 against the same specific interval of time from a different time duration 216, such as a previous week. For example, the marked events from a "Monday 10.00 AM-11.00 AM" from a week "A" may be compared with a "Monday 10.00 AM-11.00 AM" from a week "B", wherein the week "B" may be any week prior to week "A". The data mapper 140 may implement the first cognitive learning operation 218 to calculate a percentage by comparing marked events from against the actual day to allocate the data probity score 224. The data probity score 224 may correspond to the accurateness, quality, and completeness of the target data 204 included within the associated plurality of events 214.

In accordance with various embodiments of the present disclosure, the determination of the data probity score 224 includes a data probity check. The data probity check may be implemented using the Latitude Data Index (LDI) algorithm. The LDI algorithm may be used to remove noise/anomalies from the plurality of events 214. In an example, the plurality of events 214 collected from the target data 204 may be sliced on a twenty-four (24) hour basis for each day of a week. A time-series prediction may be deployed to recognize the pattern in the plurality of events 214. The data probity check implemented on the plurality of events 214 for a specific interval of time for example, a specific hour of day may include an inter-probity check and an intra-probity check. The inter-probity check may check for data anomalies by comparing the plurality of events 214 from a data wedge with historical target data 204 (explained below).

The intra-probity check may check for data anomalies for the time duration 216 associated with the specific interval of time. For example, the intra-probity check may include checking the data quality amongst the plurality of wedges sliced from target data 204 obtained for a particular time duration 216, such as twenty-four (24) hours. The data mapper 140 may distribute the target data 204 associated with the plurality of events 214 for a data wedge from the plurality of data wedges 212 normally and sort it according to their respective data probity scores. The LDI algorithm may calculate a target data 204 length and cut the data based on a series of latitude points to get the first quarter index of the data. In an example, the target data 204 length may be the target data 204 collected for the time duration 216 for example, twenty-four (24) hours. In an example, the latitude points may be the specific interval of time from the time duration 216. For example, if the specific interval of time may be one-hour, the latitude points may be "10.00 AM", "11.00 AM", "12.00 Noon", "01.00 PM" and the like. The LDI algorithm may identify a latitude index value based on variation in the data length. In an example, the latitude index value may be pre-defined into the system 110 corresponding to a data length. The intra-probity check may include calculating a first latitude index by dividing the data length with the latitude index value. The first latitude index may be a trend of the target data 204 for a specific time period from the time duration 216. For example, the first latitude index may be a trend of the target data 204 for the first 12 hours from the twenty-four (24) hour time duration 216. The intra-probity check may further calculate a second latitude index by subtracting the first latitude index from the data length. The second latitude index may be a trend of the target data 204 for a time period from the time duration 216 that may be different from the time period for the first latitude index. For example, the second latitude index may be a trend of the target data 204 for the last 12 hours from the twenty-four (24) hour time duration 216. The intra-probity check may further include calculating a latitude data index value by subtracting the second latitude index from the first latitude index. The intra-probity check may further include calculating maxima by determining a product of the latitude data index value and the data threshold value 220 and adding the second latitude index to the same. The maxima may correspond to the upper data limit 228 described above. The plurality of events 214 breaching the maxima may be detected by the data mapper 140 as data anomalies.

The data mapper 140 may implement the first cognitive learning operation 218 to create a data probity index 226 for the data pattern model 242 associated with each of the plurality of data wedge. The data probity index 226 may comprise the plurality of events 214 associated with the data pattern model 242 arranged according to their respective data probity score 224. As mentioned above, the data mapper 140 may allocate the data probity score 224 to the plurality of events 214 that may be measured within the upper data limit 228 and the lower data limit 230, and the system 110 may only consider the plurality of events 214 falling within the upper data limit 228 and the lower data limit 230 for resolving the query 202. The data probity index 226 may include the plurality of events 214 from a data wedge from the plurality of data wedges 212 that may be arranged in a sequential manner corresponding to the data probity score 224 for each of the plurality of events 214. For example, the data probity index 226 may include the plurality of events 214 for a particular hour of a day arranged according to the data probity score 224 allotted to each of the plurality of events 214.

The data rectifier 150 may implement a second cognitive learning operation 236 to identify a data anomaly cluster 232 for each data pattern model 242 based on mapping the data probity index 226 for the data pattern model 242 with the data probity index 226 for a historical data pattern model 234 for a corresponding interval of time from the time duration 216. The historical data pattern model 234 may be obtained from the target data 204. For example, the data rectifier 150 may compare the data probity index 226 for the plurality of events 214 associated with a particular hour from a day of a week with the data probity index 226 for the plurality of events 214 associated with the same hour from the same day from a different week such as a week prior to the week mentioned above. The data rectifier 150 may identify the data anomaly cluster 232 based on the aforementioned comparison. The inter probity check mentioned above may include the aforementioned comparison. The data rectifier 150 may identify differences between the data probity index 226 for the data pattern model 242 and the data probity index 226 for the historical data pattern model 234. In accordance with various embodiments of the present disclosure, the data mapper 140 may implement a profiling and segregation algorithm as part of the second cognitive learning operation 236 to identify the data anomaly cluster 232. As mentioned above, the first cognitive learning operation 218 may mark the data points that may be breaching the upper data limit 228 and the lower data limit 230. The data points that may be breaching the upper data limit 228 and the lower data limit 230 may be referred to as data outliers. The profiling and segregation algorithm may measure the distance of the identified outliers from their counterparts based on the profiling formula:

$$x_i - x_{i+1}$$

wherein, $x_i$ may represent each data point. In an example, each data point may correspond to memory utilization in an hour (as mentioned above). Each data point for memory utilization may be compared with each other data point for the given specific interval of time, for example, a given hour. The memory utilization data may be arranged in an ascending order based on the differences, wherein points that may be closer to each other may be grouped in one cluster, for example, a range up to 10 units. The aforementioned comparison may be segregated and profiled into low, medium and high values based on memory utilization. For example, lesser utilized data points may be profiled into a low cluster, higher utilization data points may be profiled into a high cluster and medium utilization data points may be profiled into a medium cluster. The values in the high cluster may be compared with the low cluster and the medium cluster and checked for the differences. In an example, rare events wherein there may be a sudden peak in data points that may occur occasionally. The system 110 may analyze the presence of such rare events and if they persist, the data rectifier 150 may update them into data trends of a server and it may not be reported as a data anomaly. The results of the aforementioned comparison and analysis of the rare events may be propagated back to the algorithm as reinforced learning and a value for the data threshold value 220 may be set automatically so that the anomalies are identified accordingly in the future. The profiling and segregation may analyze a trend of memory utilization of the server for a particular hour. The data anomaly cluster 232 may include outlier data from the target data 204. The data rectifier 150 may identify the data anomalies within the data pattern model 242 for a data wedge from the plurality of data wedges 212.

The data rectifier 150 may implement the second cognitive learning operation 236 to establish a data accommodation model 238 corresponding to each of the plurality of data wedges 212. The data accommodation model 238 may comprise an associated data pattern model 242 for a data wedge from the plurality of data wedges 212 deficient of the data anomaly cluster 232. The data rectifier 150 may remove the outlier data as identified by the data anomaly cluster 232 from the data pattern model 242 for the specific interval of time for each of the plurality of data wedges 212. The data rectifier 150 may remove the data anomaly cluster 232 from the data pattern model 242 to form the data accommodation model 238. The data accommodation may include target data 204 devoid of data anomalies. The data rectifier 150 may implement the second cognitive learning operation 236 to update the data threshold value 220 based on the data accommodation model 238 and the data anomaly cluster 232 corresponding to each of the plurality of data wedges 212. As mentioned above, the system 110 may analyze the rare events and update the data trends based on the persistence of rare events in a data pattern model 242 for a particular specific interval of time. The system 110 may update the data trends by updating the data threshold value 220. The update in the data threshold value 220 may lead to an update in the upper data limit 228 and the lower data limit 230. As mentioned above, the system 110 may detect the data anomalies based on the data threshold value 220, the upper data limit 228, and the lower data limit 230 by only considering the plurality of events 214 (data points) that may fall within the upper data limit 228 and the lower data limit 230.

In accordance with various embodiments of the present disclosure, the data rectifier 150 may further determine a data accommodation index indicative of a level of data anomaly detection achieved in at least a part of the target data 204 through the implementation of the artificial intelligence component 210, the first cognitive learning operation 218, and the second cognitive operation. The data accommodation index may include a conglomerate of the data accommodation model 238 for each of the plurality of wedges. The data accommodation index may include a conglomerate of the data anomaly cluster 232 for each of the plurality of wedges. For example, as mentioned above, the data accommodation model 238 may be may comprise an associated data pattern model 242 for a data wedge from the plurality of data wedges 212 deficient of the data anomaly cluster 232. The data accommodation index may comprise a collated set of the data accommodation model 238 and a collated set of the data anomaly cluster 232 for each of the plurality of data wedges 212 for the time duration 216. For example, the data accommodation index fora day may include all the data anomalies detected during a twenty-four (24) hour time period. The data accommodation index for a day may include all the data accommodation model 238s created during the twenty-four (24) hour time period. The system 110 may calculate a level of data anomaly detection by comparing the collated set of the data accommodation model 238 with the collated set of the data anomaly cluster 232 for each of the plurality of data wedges 212 for the time duration 216.

The data rectifier 150 may establish an anomaly library, by associating the data anomaly cluster 232 and the data accommodation model 238 for the time duration 216 identified by the artificial intelligence component 210 with a data anomaly detection requirement 206. The system 110 may deploy the anomaly library for validation of the data anomaly cluster 232. The system may associate data trends present in the data accommodation model 238 with data points that may be identified within the data anomaly cluster 232. The 110 may store the results from the aforementioned mapping and deploy them for processing a future data anomaly detection requirement 206.

The data rectifier 150 may implement the second cognitive learning operation 236 to generate a data anomaly detection result 240 corresponding to the data anomaly detection requirement 206. The data anomaly detection result 240 may comprise the data accommodation model 238 and the data anomaly cluster 232 relevant for the resolution to the query 202 (explained further by the way of subsequent Figs.). In accordance with various embodiments of the present disclosure, the data rectifier 150 may obtain a user input to implement the data anomaly detection result 240. In accordance with various embodiments of the present disclosure, the data rectifier 150 may update the target data 204 based on an update in the data anomaly detection result 240, the data accommodation model 238 and the data anomaly cluster 232. The data rectifier 150 may implement the second cognitive learning operation 236 to initiate anomaly detection on the target data 204 to resolve the query 202 based on the data anomaly detection result 240. In an example, the data rectifier 150 may require a user-input to initiate anomaly detection of the target data 204 to resolve the data anomaly detection requirement 206 based on the data anomaly detection result 240. In another example, the data rectifier 150 may automatically initiate anomaly detection of the target data 204 to resolve the data anomaly detection requirement 206 based on the data anomaly detection result 240. The system 110 may be configurable to perform anomaly detection on the target data 204 automatically and/or based on user input.

The embodiments of the artificial intelligence component 210, the first cognitive learning operation 218, and the second cognitive learning operation 236 presented herein may be exemplary in nature.

In operation, the system 110 may be used to detect data anomalies in the target data 204. The system 110 may deploy the latitude detection algorithm for the detection of data anomalies. The system 110 may group data based on a time factor such as for example, an hourly basis for a particular day. The system 110 may compare data for a specific hour from a specific day for example, a data set from a Monday at 10.00 AM may be compared with a data set from a Monday at 10.00 AM from a previous week. Such a comparison may be referred to as a "same time different day comparison". The system may identify the difference in data patterns and access the same for the detection of data anomalies. Further, the system 110 may compare a data set from a particular hour of a particular day with a dataset from a different hour from the same particular day. For example, a data set from a Monday at 10.00 AM may be compared with a data set from the same Monday at 04.00 PM. Such a comparison may be referred to as a "different time same-day comparison" The results from the "same time different day comparison" and "different time same-day comparison" may be used to detect data anomalies in the target data 204 and create the data anomaly cluster 232, the data accommodation model 238 and the data accommodation index. The results from the "same time different day comparison" may be used to update the data threshold value 220, the upper data limit 228 and the lower data limit 230. However, the results from the "same time different day comparison" may detect the rare events to be as data anomalies and include them in the data anomaly cluster 232. This may be because the rare events may breach the upper data limit 228 and the lower data limit 230 from the different day. The results from the "different time same-day comparison" may be used to analyze such rare events, and filter them out from the data anomaly cluster 232 and add them to the data accommodation model 238. The system 110 may deploy the latitude data algorithm to determine results for the "same time different day comparison", and the "different time same-day comparison". The system 110 may deploy the profiling algorithm to filter out the rare events from the data anomaly cluster 232 and add them to the data accommodation model 238. The system 110 may update the data threshold value 220, the upper data limit 228 and the lower data limit 230 according to the results from the "same time different day comparison" and the results from the "different time same-day comparison", thereby ensuring reinforced learning for data anomaly detection by the system 110.

Accordingly, the system 110 may provide a data anomaly detection system may be required to understand a data trend, identify right anomalies, and reinforce learning from anomalies detected to automatically update the data trend to solve issues related to anomaly detection on a real-time basis. The embodiments presented for the system 110 herein may be exemplary in nature, and the same should be clear to a person skilled in the art.

Figure 3:
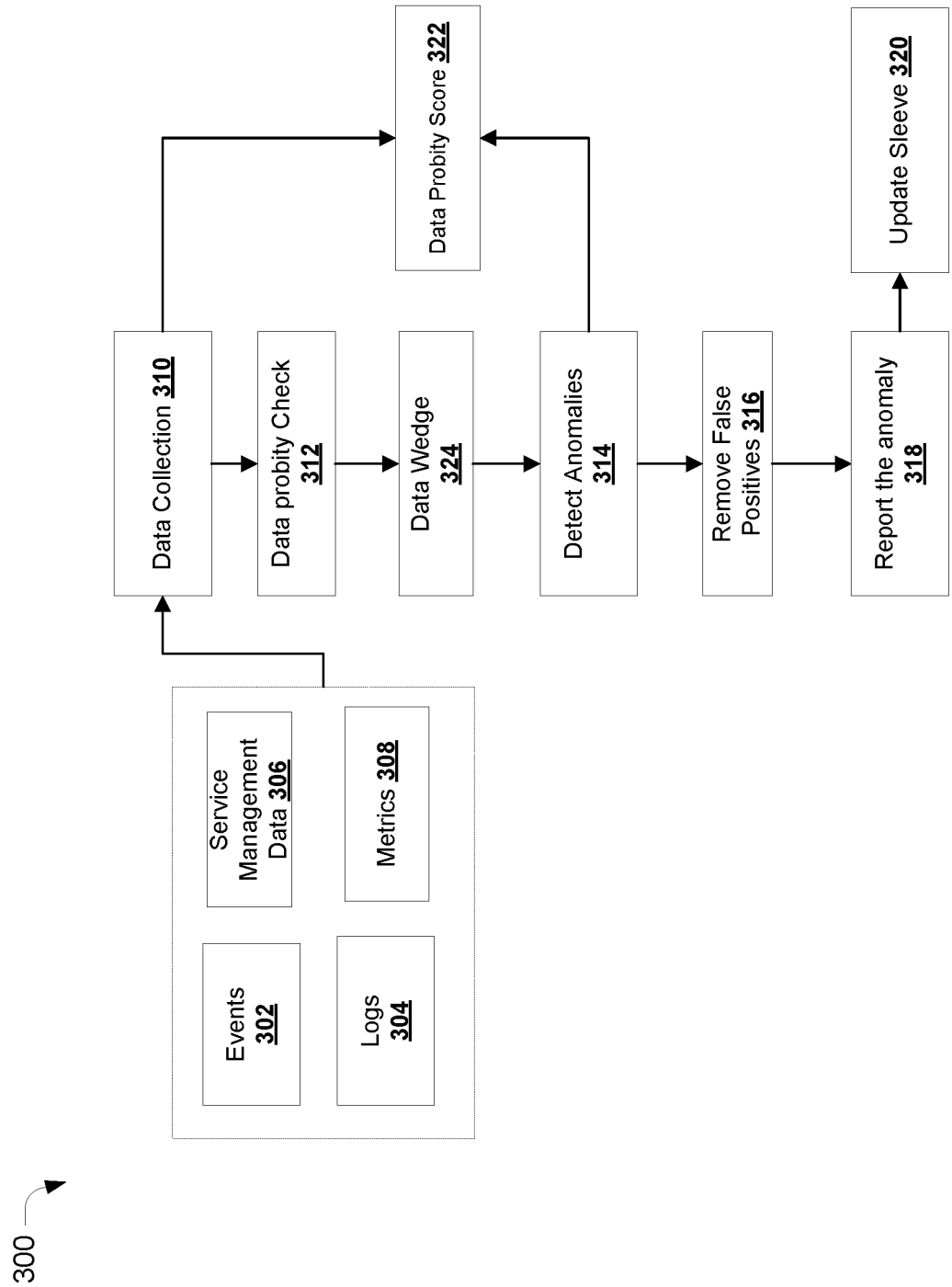
FIG. 3 illustrates a flow diagram for an approach deployed for data anomaly detection by a data anomaly detection system, according to an example embodiment of the present disclosure.

FIG. 3 illustrates a flow diagram 300 for an approach deployed for data anomaly detection by a data anomaly detection system, according to an example embodiment of the present disclosure. Any of the components described above by way of FIGS. 1-2 may be referred to for describing the flow diagram 300. In accordance with various embodiments of the present disclosure, the system 110 may include a set of events 302, a set of logs 304, a metrics 308, and a service management database 306. The system 110 may deploy the set of events 302, the set of logs 304, the metrics 308, and the service management database 306 for performing a data collection 310. The system 110 may perform a data probity check 312 after executing the data collection 310. The system 110 may perform the data probity check by implementing the artificial intelligence component 210 and the first cognitive learning operation 218 on a data wedge 324 as mentioned above by way of FIG. 1 and FIG. 2. In an example, the data wedge 324 may be a part of the plurality of data wedges 212. For example, the collected data by the data collection 310 may be diced into hourly blocks of information and may be compared against the corresponding time of the day of the week. This may provide a time-based context to the data making the data comparison more efficient. For example, the data slicing may provide a time-based context to the data and help in providing a clear data insight to the collected data by slicing into an hourly basis for twenty-four (24) hours in a day and comparing it against the respective day and hour of the week.

The system 110 may perform the inter-probity check and the intra-probity check to assign a data probity score 322 to the data wedge 324. The data probity score 322 may be the same as the data probity score 224 mentioned above by way of FIG. 1 and FIG. 2. The system 110 may detect a set of data anomalies 314 based on the data probity score 322 and the result of the implementation of the artificial intelligence component 210 and the first cognitive learning operation 218 as mentioned above by way of FIG. 1 and FIG. 2. In an example, the system 110 may deploy the diced data to detect the set of data anomalies 314. The system 110 may implement the second cognitive learning operation 236 to remove a set of false positives 316 from the set of data anomalies 314 as mentioned above by way of FIG. 2. The false positives may be rare events that may happen occasionally and may be detected as a positive result for data anomaly due to them not conforming to previous upper data limit 228 and lower data limit 230. However, they may not be data anomalies just rare events from the plurality of events 214. In an example, the false positives may be removed from the processed data instead of detecting them as anomalies. The system 110 may create a report 318 comprising the set of data anomalies 314. The report 318 may be sent to a user of the system 110. The report 318 may be a document but may also be an alert, an e-mail, or other notification. The system 110 may perform an update 320, wherein the system 110 may update the data threshold value 220, the upper data limit 228 and the lower data limit 230 based on the set of data anomalies 314, and the report 318.

Figure 4:
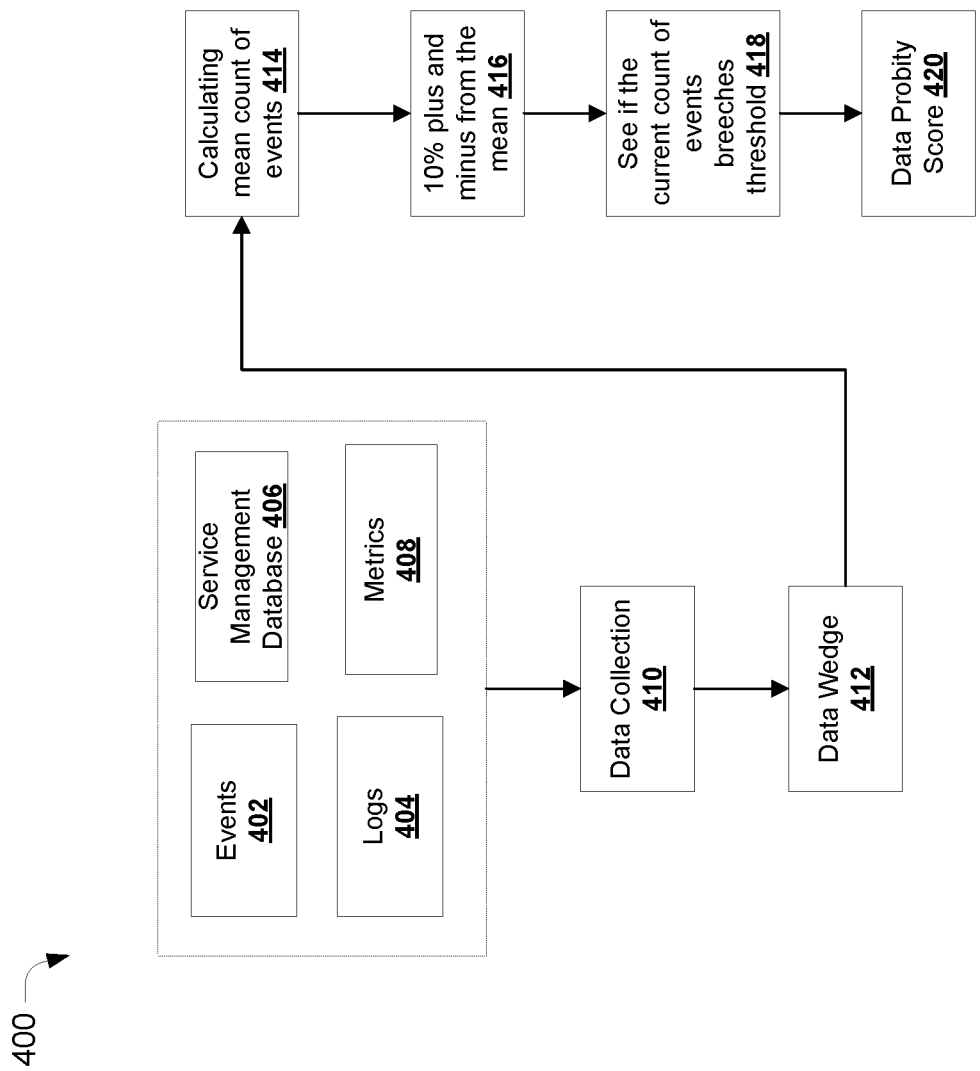
FIG. 4 illustrates a flow diagram of a data integrity check as deployed by a data anomaly detection system, according to an example embodiment of the present disclosure.

FIG. 4 illustrates a flow diagram of a data integrity check 400 as deployed by the data anomaly detection system 110, according to an example embodiment of the present disclosure. Any of the components described above by way of FIGS. 1-3 may be referred to for describing the data integrity check 400. The data integrity check 400 may be a procedure for calculation of the data threshold value 220, the upper data limit 228 and the lower data limit 230. The data integrity check 400 may be a schema of the rectitude analysis of the target data 204 that may be designed to ensure the factor of data quality may be an indexing medium of the target data 204 before processing the data for resolving the query 202. In accordance with various embodiments of the present disclosure, the system 110 may include a set of events 402, a set of logs 404, a metrics 408, and a service management database 406. The system 110 may deploy the set of events 402, the set of logs 404, the metrics 408, and the service management database 406 for performing a data collection 410. The system 110 may implement the artificial intelligence component 210 to identify a data wedge 412 as mentioned above by way of FIG. 1 and FIG. 2. In an example, the data wedge 412 may be a part of the plurality of data wedges 212. In an example, the data wedge 412 may be the same as the data wedge 324. The system 110 may implement the first cognitive learning operation 218 on the data wedge 412. In an example, the first cognitive learning operation 218 may include the implementation of the LDI algorithm as mentioned above. The data integrity check 400 may include implementing a calculation 414 as part of the first cognitive learning operation 218. The calculation 414 may include calculating a mean count of the plurality of events 214 by grouping it overtime, for example, by grouping it over the specific interval of time. This may enable the system 110 to get a mean specific for a time period. The mean count of events may be used to set the data threshold value 220. The data integrity check 400 may include implementing a calculation 416 after the calculation 414 as part of the first cognitive learning operation 218. The calculation 416 may include calculating a value that may be higher from the mean count and a value that may be lesser than the mean count. For example, calculation 416 may include calculating a value that may be 10% higher from the mean count and a value that may be 10% lesser than the mean count. The system 110 may take the 10% plus as an upper bound threshold and the 10% minus as a lower bound threshold. In accordance with various embodiments of the present disclosure, the upper bound threshold may be the upper data limit 228, and the lower bound threshold may be the lower data limit 230.

The data integrity check 400 may further include implementing an analysis 418 as part of the first cognitive learning operation 218. The analysis 418 may include marking a count of the plurality of events 214 that may breach the upper data limit 228, and the lower data limit 230. The analysis 418 may further include comparing the results from the aforementioned marking against the same timeframe in the previous week. for example, the system 110 may compare results from a marking on a Monday at 10:00 AM against results from a marking on a Monday at 10:00 AM from a different week. The data integrity check 400 may further include assigning a data probity score 420 based on the results from the analysis 418. The data probity score 420 may be the same as the data probity score 224. In accordance with various embodiments of the present disclosure, the data integrity check 400 may include the intra-probity check and the inter probity check mentioned above by way of FIG. 1 and FIG. 2.

Figure 5:
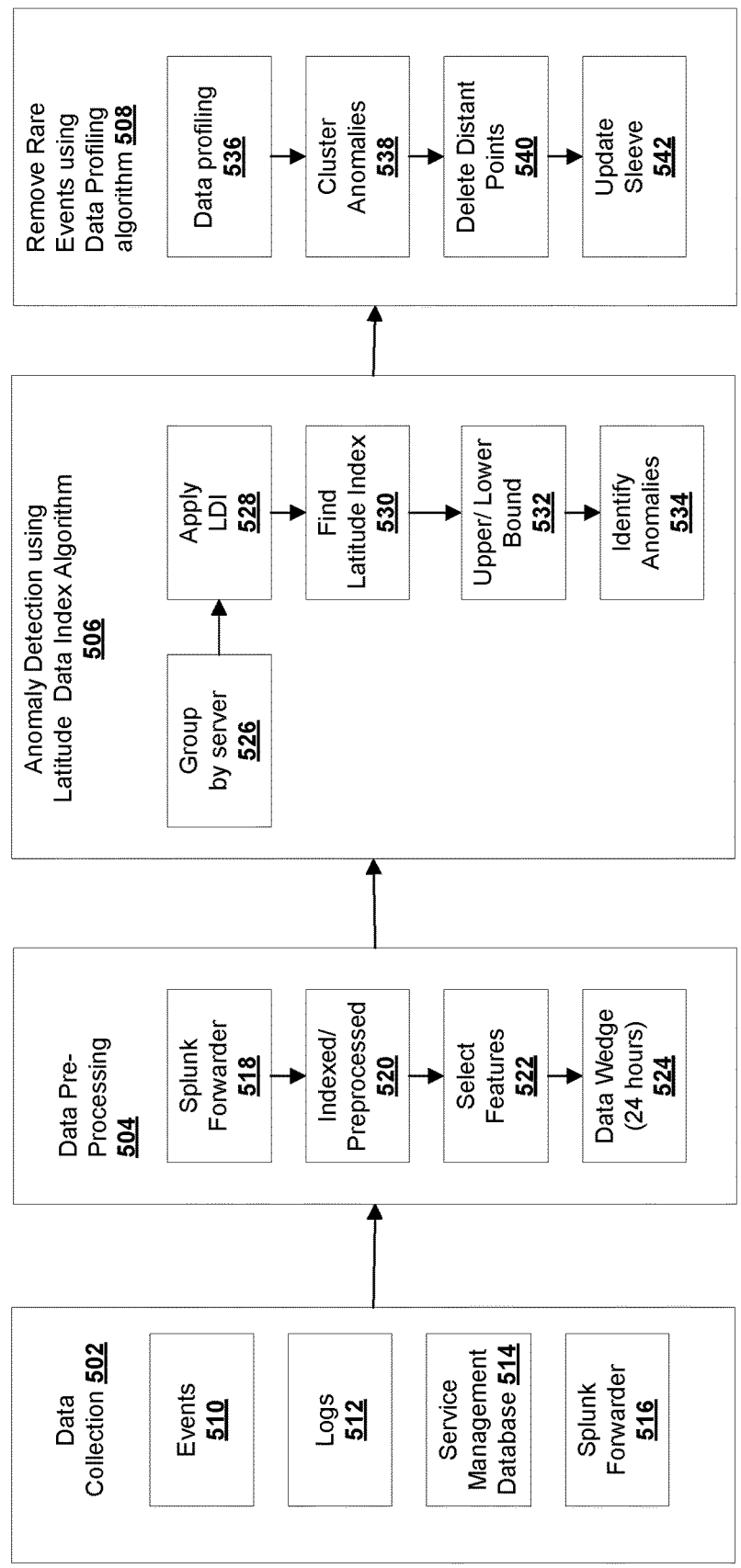
FIG. 5 illustrates a flow diagram for various steps for data processing deployed by a data anomaly detection system, according to an example embodiment of the present disclosure.

FIG. 5 illustrates a flow diagram 500 for various steps for data processing deployed by the data anomaly detection system 110, according to an example embodiment of the present disclosure. Any of the components described above by way of FIGS. 1-4 may be referred to for describing the flow diagram 500. The flow diagram 500 may include a data collection 502, a data pre-processing 504, an anomaly detection 506, and a data profiling 508. Each of the steps mentioned by way of the flow diagram 500 may have been explained above by way of FIG. 1 and FIG. 2. The data collection 502 may include obtaining the target data 204 from the plurality of sources as mentioned above. The data collection 502 may include a set of events 510, a set of logs 512, a service management database 514, a Splunk® forwarder 516. The Splunk® forwarder 516 may be used for secure remote data collection and data forwarding. The system 110 may collect data from the set of events 510, the set of logs 512, the service management database 514, the Splunk® forwarder 516 and send the data for the data pre-processing 504. In an example, the Splunk® forwarder 516 may send data for the data pre-processing 504.

The data pre-processing 504 may include a Splunk® forwarder 518, a preprocessed index 520, a selection 522, and a data wedge 524. The Splunk® forwarder 518 may be used for receiving data from the Splunk® forwarder 516. The preprocessed index 520 may be created by implementing the artificial intelligence component 210 on the data received by the Splunk® forwarder 518. The preprocessed index 520 may include the target data 204 synchronized into an index based on a time component. For example, the target data 204 may be arranged according to a time it might have been obtained. The artificial intelligence component 210 may further perform the selection 522. The selection 522 may include selecting the data sorted into the preprocessed index 520 based on the time component. For example, selecting data that may be obtained between 10.00 AM-11.00 AM, data obtained between 11.00 AM and 12.00 Noon, and the like. The selection 522 may lead to the creation of a data wedge 522. The data wedge 522 may be a part of the plurality of data wedges 212. The system 110 may send the data wedge 522 for anomaly detection 506. The anomaly detection 506 may be performed by deploying the latitude data index algorithm as described above. The anomaly detection 506 may perform a grouping 506, wherein the data present in the data wedge 522 may be grouped by a server from where it may have been obtained. The anomaly detection 506 may execute an application 528, wherein the latitude data index algorithm may be applied to the grouped data. The latitude data index algorithm may implement a computation 530, wherein the latitude data index from the grouped data may be computed as described above by FIG. 1 and FIG. 2. The results from the computation 530 may be used to perform a calculation 532, wherein the data threshold value may be calculated. The calculation 532 may be the same as the calculation 414, and the calculation 416 as mentioned above. The results from the calculation 532 may be used to perform a detection 534, wherein the data anomalies may be detected. As mentioned earlier, the system 110 may mark the data falling outside the data threshold value and identify the same as anomalies.

The results from the detection 534 may be sent for the data profiling 508. The data profiling 508 may analyze the results from the detection 534 for any results that may be positive but may have been identified as a data anomaly by the detection 534 based on the calculation 532. For example, there may be some data points that may have a value significantly different from other data points with the same specific interval of time for the past few weeks. However, the significant change may be seasonal may not be an anomaly, the data profiling 508 may take such external factors affecting data into consideration and remove such false positives from the results of the detection 534. The data profiling 508 may be implemented using a profiling algorithm as described by way of FIG. 1 and FIG. 2. The data profiling 508 may execute a data profiling 536, wherein the data may be profiled according to the value associated with data points into the low cluster, the high cluster, and the medium cluster (described by way of FIG. 1 and FIG. 2). The data profiling 508 may execute a clustering 538, wherein the data anomalies may be clusters and the data anomaly cluster 232 may be determined. The data profiling 508 may execute a deletion 540, wherein datapoint values that may be distant from any of the low cluster, the high cluster, and the medium cluster may be deleted. The data profiling 508 may update the upper data limit 228 and the lower limit based on the clustering 538.

Figure 6:
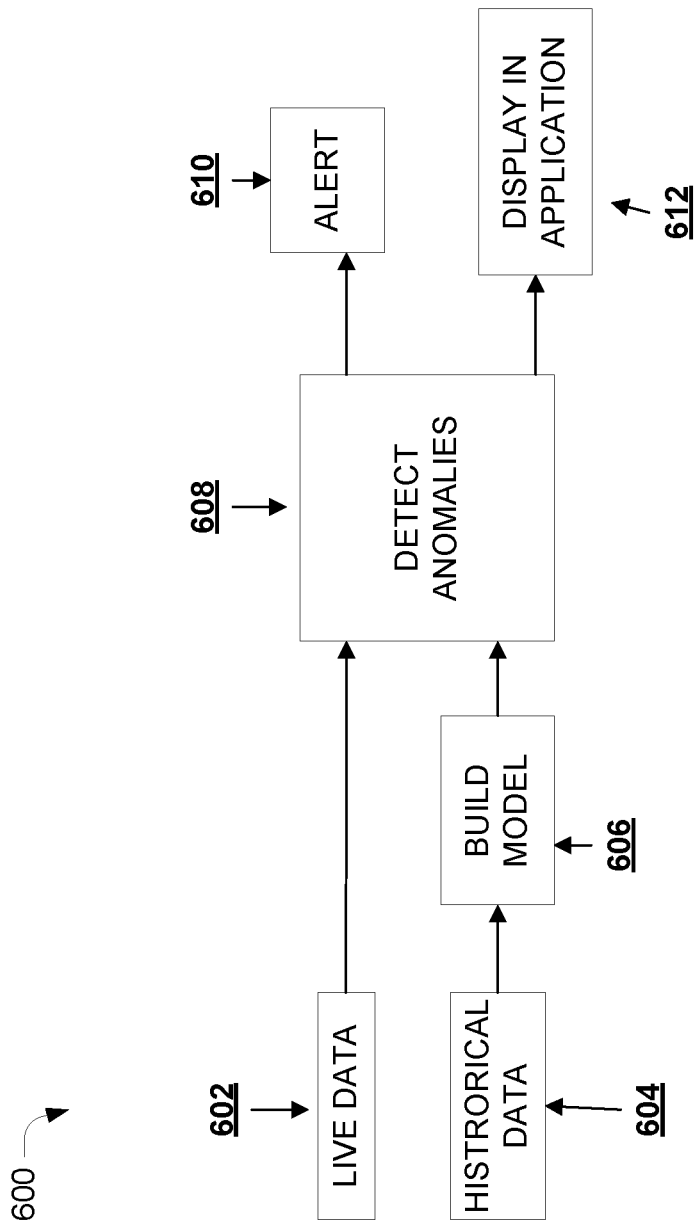
FIG. 6 illustrates a pictorial representation for the implementation of a data anomaly detection system according to an example embodiment of the present disclosure.

FIG. 6 illustrates a pictorial representation 600 for implementation of the data anomaly detection system 110 according to an example embodiment of the present disclosure. Any of the components described above by way of FIGS. 1-5 may be referred to for describing the flow diagram 600. The system 110 may include collecting data 602. In an example, the system 110 may deploy the techniques mentioned above for collecting data 602. In an example, data 602 may be collected on a real-time basis. The system 110 may include a historical database 604. In an example, the system 110 may store the target data 204 that may have been processed earlier for data anomaly detection as historical data 304. The system 110 may build a data anomaly detection model 606. The data anomaly detection model 606 may detect anomalies in the live data 602. In an example, the data anomaly detection model 606 may be the data accommodation model 238 described above. The data anomaly detection model 606 may be used to execute a detection 608 for data anomalies from the live data 602 using the tools and techniques deployed above. The system 110 may generate an alert 610 for a user of the system 110 based on the detection 608 of the data anomaly. In accordance with various embodiments of the present disclosure, the system 110 may display results 612 of the detection 608 to a user in an electronic format.

FIGS. 7A-7D illustrate a pictorial representation of a use case for calculation of the data probity score 224 for data anomaly detection using the data anomaly detection system 110, according to an example embodiment of the present disclosure. FIG. 7A illustrates a data wedge 702. The data wedge 702 may be a part of the plurality of data wedges 212. The data wedge 702 may include the plurality of events 214. FIG. 7B may illustrate a table 704. The table 704 may illustrate the calculation 414, wherein the mean count of the plurality of events 214 for the data wedge 702 may be calculated. FIG. 7C may illustrate a table 706. The table 706 may illustrate the calculation 416, wherein the upper data limit 228 and the lower data limit 230 may be calculated. FIG. 7D may illustrate a table 708. The table 708 may illustrate the analysis 418, wherein plurality of events 214 that may breach the data threshold value may be marked. FIG. 7D may further include a score 710. The score 710 may be the data probity score 224. In the illustrated example for the illustrated data, the score 710 may be 91.67%. The score 710 may be generated by the system through the implementation of the Latitude Data Index (LDI) algorithm. The upper data limit that may be calculated by the system 110 for each specific interval of time such as, for example, each hour may be compared against the upper data limit from the previous weeks. The system 110 may deploy the profiling algorithm for predicting only the actual anomalies. For example, only 9% of the given data points may be anomalies or true incidents that may be resolved.

Figure 8B:
Figure 8C:
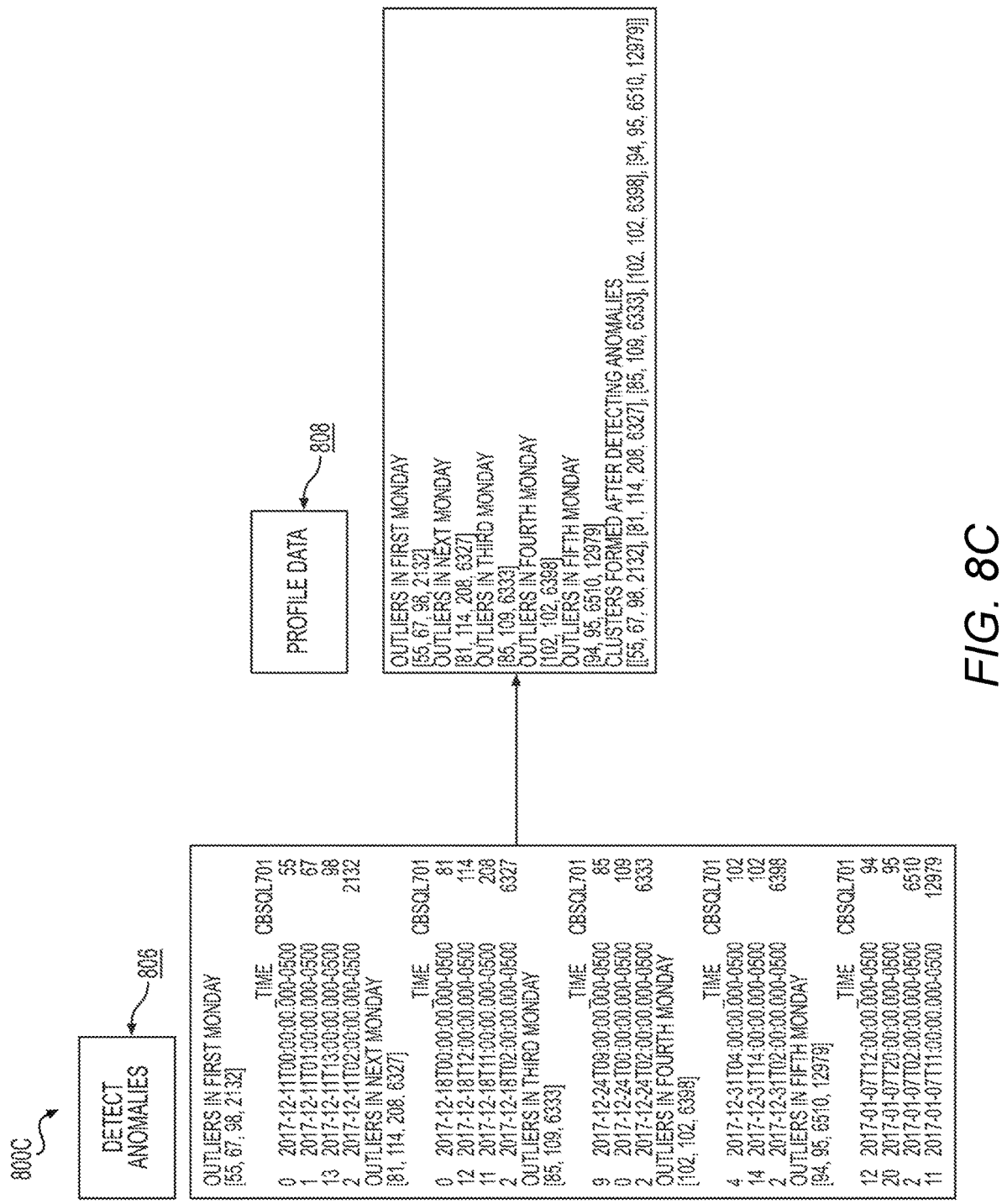

FIGS. 8A-8D illustrate a pictorial representation of an output from an algorithm deployed by a data anomaly detection system for data anomaly detection, according to an example embodiment of the present disclosure. FIG. 8A may illustrate a data collection 802. The data collection 802 may be the same as obtaining the target data 204 from the plurality of data sources 208 as described above. FIG. 8B may illustrate a data wedge generation 804. The data wedge generation 804 may include the implementation of the artificial intelligence component 210 to sort the target data 204 into the plurality of data wedges 212. Each data wedge may comprise the plurality of events 214 and each event may comprise a portion of the target data 204 obtained over a time duration 216 identified by the artificial intelligence component 210. FIG. 8C may illustrate a data set 806, wherein the data anomalies have been detected by the implementation of the latitude detection algorithm as mentioned above. FIG. 8C may further illustrate a data set 808, wherein the data set 806 may have been profiled using the profiling algorithm for detection of any positive results that may be false. FIG. 8D may illustrate a data set 810, wherein any false positive anomalies may have been removed and remaining data anomalies have been reported to a user.

Figure 9:
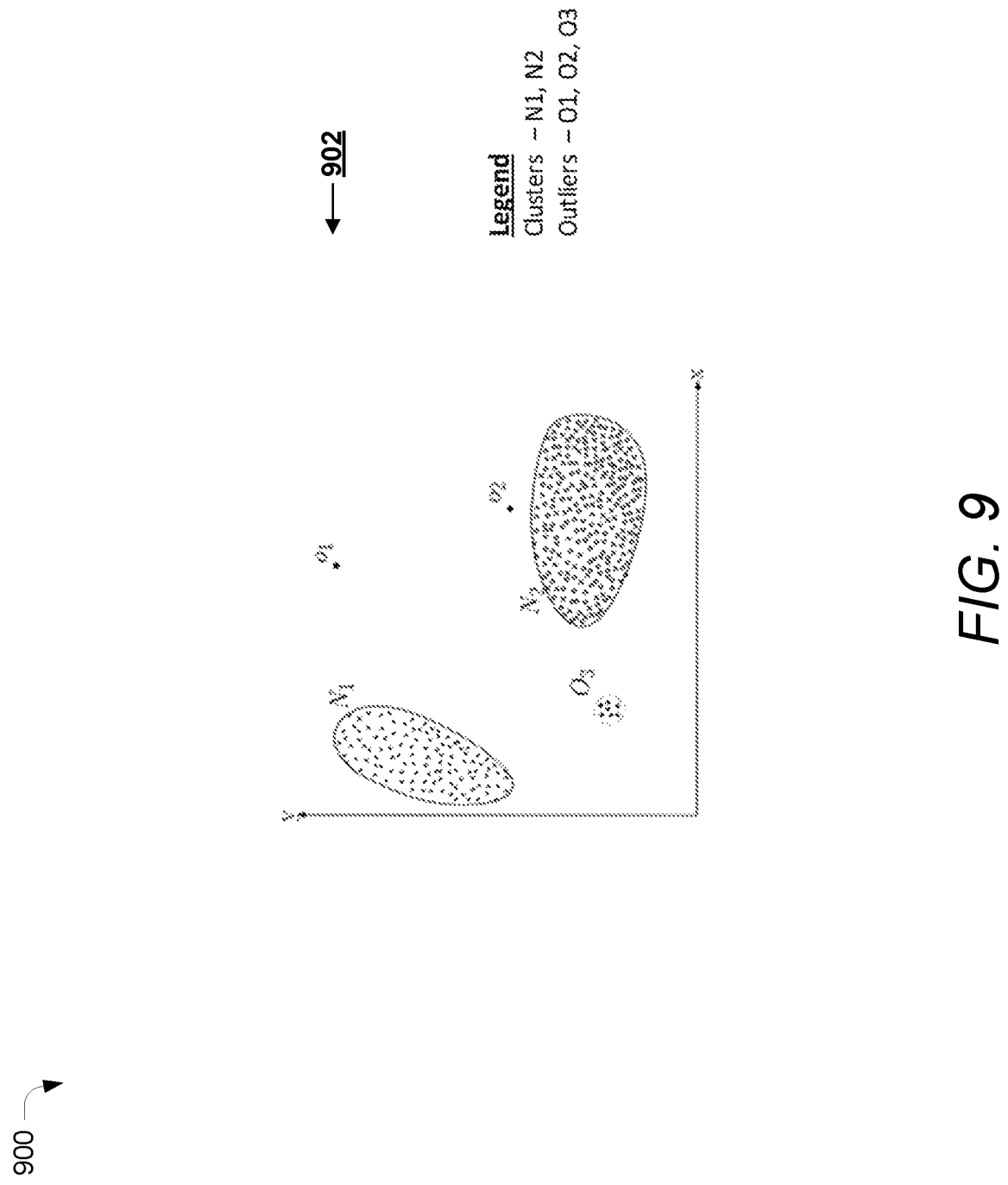
FIG. 9 illustrates a pictorial representation of data clusters and outlier data identified using a data anomaly detection system, according to an example embodiment of the present disclosure.

FIG. 9 illustrates a pictorial representation 900 of data clusters and outlier data identified using the data anomaly detection system 110, according to an example embodiment of the present disclosure. The pictorial representation 900 illustrates a set of clusters 902. The clusters O1, O2, and O3 illustrated in FIG. 9 may be the data anomalies. The clusters N1, and N2 illustrated in the FIG. 9 may be the data accommodation model 238 as described above. In accordance with various embodiments of the present disclosure, using the proposed automatically reinforced anomaly detection algorithm, the false positives from the data anomalies may be removed without manual intervention and rare events may be detected accurately. The algorithm may be scaled up to predict failure by identifying the overutilization of the metrics.

Figure 10:
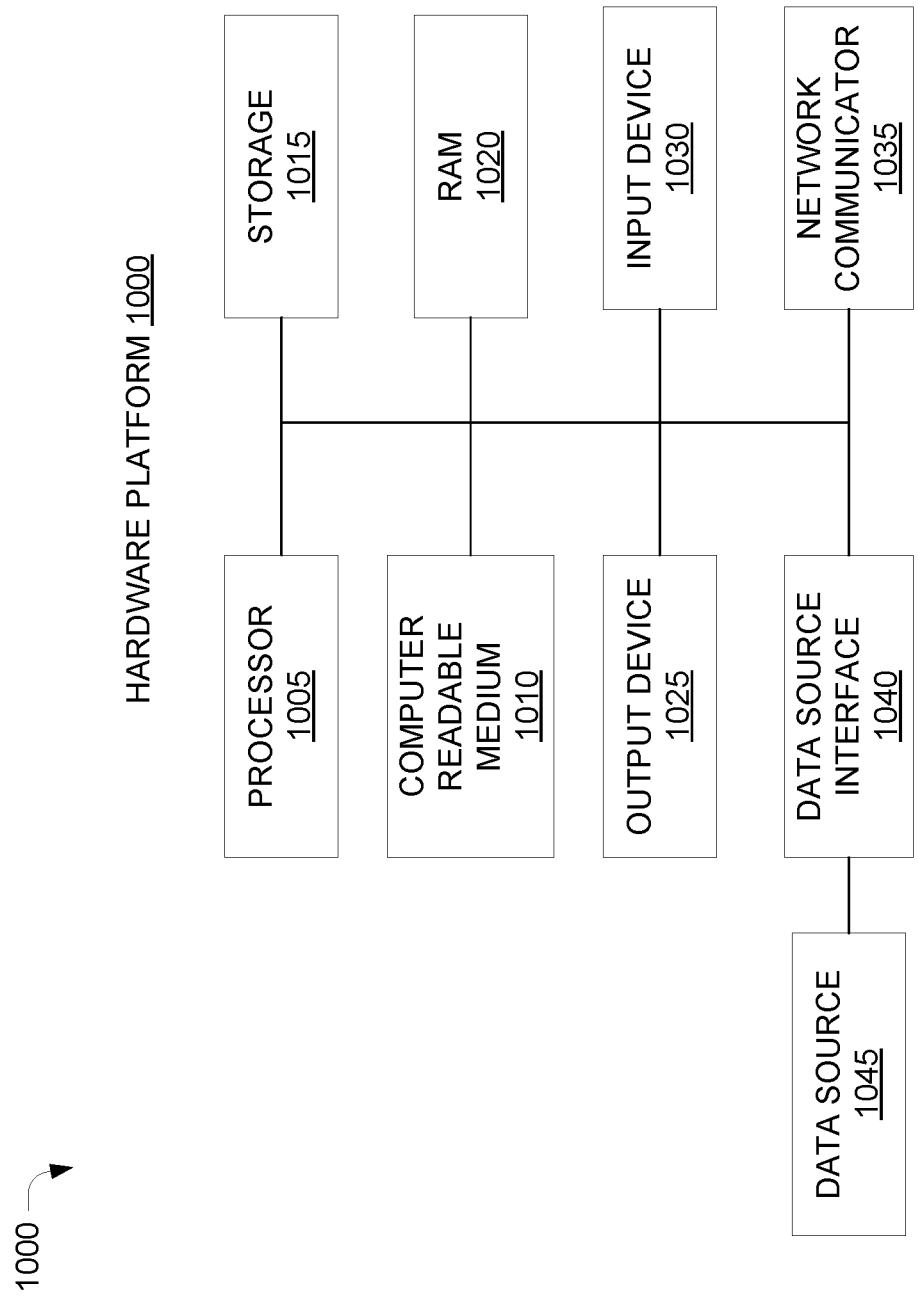
FIG. 10 illustrates a hardware platform for the implementation of a data anomaly detection system, according to an example embodiment of the present disclosure.

FIG. 10 illustrates a hardware platform 1000 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1000. The hardware platform 1000 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 10, the hardware platform 1000 may be a computer system 1000 that may be used with the examples described herein. The computer system 1000 may represent a computational platform that includes components that may be in a server or another computer system. The computer system 1000 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1000 may include a processor 1005 that executes software instructions or code stored on a non-transitory computer-readable storage medium 1010 to perform methods of the present disclosure. The software code includes, for example, instructions to gather data and documents and analyze documents. In an example, the data dissector 130, the data mapper 140, and the data rectifier 150 may the software codes.

The instructions on the computer-readable storage medium 1010 are read and stored the instructions in storage 1015 or in random access memory (RAM) 1020. The storage 1015 provides a large space for keeping static data where at least some instructions could be stored for later execution. The stored instructions may be further compiled to generate other representations of the instructions and dynamically stored in the RAM 1020. The processor 1005 reads instructions from the RAM 1020 and performs actions as instructed.

The computer system 1000 further includes an output device 1025 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1000 further includes input device 1030 to provide a user or another device with mechanisms for entering data and/or otherwise interact with the computer system 1000. The input device may include, for example, a keyboard, a keypad, a mouse, or a touchscreen. Each of these output devices 1025 and input devices 1030 could be joined by one or more additional peripherals. In an example, the output device 1025 may be used to display the results of the query 202.

A network communicator 1035 may be provided to connect the computer system 1000 to a network and in turn to other devices connected to the network including other clients, servers, data stores, and interfaces, for instance. A network communicator 1035 may include, for example, a network adapter such as a LAN adapter or a wireless adapter. The computer system 1000 includes a data source interface 1040 to access data source 1045. A data source is an information resource. As an example, a database of exceptions and rules may be a data source. Moreover, knowledge repositories and curated data may be other examples of data sources.

Figure 11A:
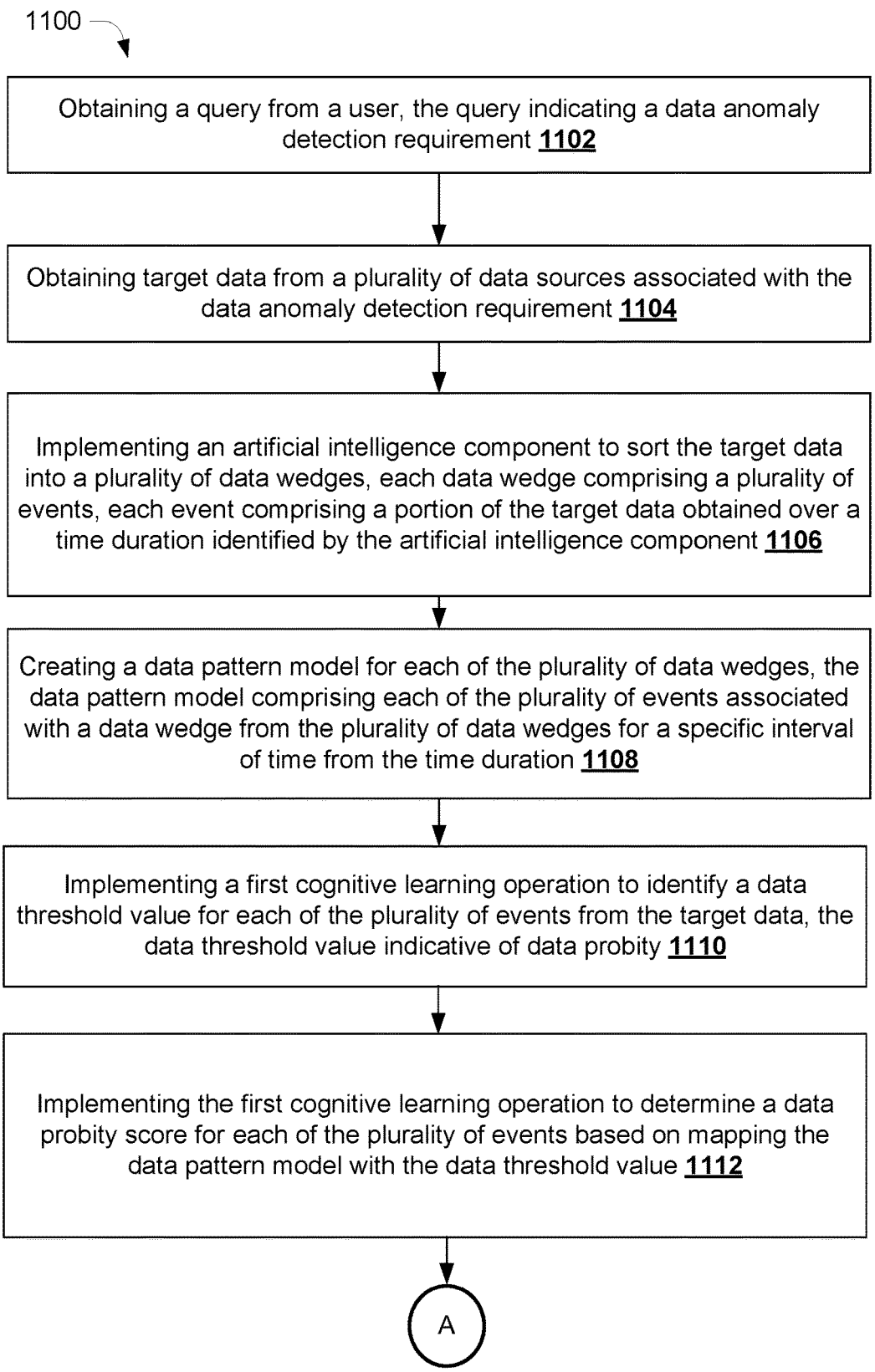

FIGS. 11A and 11B illustrate a process flowchart for process optimization using the data anomaly detection system 110, according to an example embodiment of the present disclosure.

It should be understood that method steps are shown here for reference only and other combinations of the steps may be possible. Further, the method 1100 may contain some steps in addition to the steps shown in FIG. 11. For the sake of brevity, construction and operational features of the system 110 which are explained in detail in the description of FIGS. 1-10 are not explained in detail in the description of FIG. 11. The method 1100 may be performed by a component of the system 110, such as the processor 120, the data dissector 130, the data mapper 140, and the data rectifier 150.

At block 1102, the query 202 may be obtained from a user. The query 202 may indicate a data anomaly detection requirement 206.

At block 1104, target data 204 may be obtained from the plurality of data sources 208 associated with the data anomaly detection requirement 206. In an example, the target data 204 may be obtained on a real-time basis.

At block 1106, an artificial intelligence component 210 may be implemented to sort the target data 204 into a plurality of data wedges 212. Each data wedge may comprise a plurality of events 214. Each event may comprise a portion of the target data 204 obtained over a time duration 216 identified by the artificial intelligence component 210.

At block 1108, a data pattern model 242 may be created for each of the plurality of data wedges 212. The data pattern model 242 may comprise each of the plurality of events 214 associated with a data wedge from the plurality of data wedges 212 for a specific interval of time from the time duration 216.

At block 1110, the first cognitive learning operation 218 may be implemented to identify a data threshold value 220 for each of the plurality of events 214 from the target data 204. The data threshold value 220 may be indicative of data probity.

At block 1112, the first cognitive learning operation 218 may be implemented to determine a data probity score 224 for each of the plurality of events 214 based on mapping the data pattern model 242 with the data threshold value 220.

At block 1114, the first cognitive learning operation 218 may be implemented to create a data probity index 226 for the data pattern model 242 associated with each of the plurality of data wedge. The data probity index 226 may comprise the plurality of events 214 associated with the data pattern model 242 arranged according to their respective data probity scores 224.

At block 1116, a second cognitive learning operation 236 may be implemented to identify a data anomaly cluster 232 for each data pattern model 242 based on mapping the data probity index 226 for the data pattern model 242 with the data probity index 226 for a historical data pattern model 234 for a corresponding interval of time from the time duration 216. The historical data pattern model 234 may be obtained from the target data 204 and the data anomaly cluster 232 may include outlier data from the target data 204.

At block 1118, the second cognitive learning operation 236 may be implemented to update the data threshold value 220 based on the data accommodation model 238 and the data anomaly cluster 232 corresponding to each of the plurality of data wedges 212.

At block 1120, the second cognitive learning operation 236 may be implemented to generate a data anomaly detection result 240 corresponding to the data anomaly detection requirement 206. The data anomaly detection result 240 may comprise the data accommodation model 238 and the data anomaly cluster 232 relevant for the resolution to the query 202.

At block 1122, anomaly detection may be initiated on the target data 204 to resolve the query 202 based on the data anomaly detection result 240.

In an example, the method 1100 may further include generating an alert for the user based on the data anomaly cluster 232. In accordance with various embodiments of the present disclosure, the time duration 216 may include twenty-four hours of a day, and the specific interval of time may include a one-hour time interval.

In accordance with various embodiments of the present disclosure, the method 1100 may further include establishing a data accommodation model corresponding to each of the plurality of data wedges, the data accommodation model comprising an associated data pattern model for a data wedge from the plurality of data wedges deficient of the data anomaly cluster. The method 1100 may further include determining a data accommodation index indicative of a level of data anomaly detection achieved in at least a part of the target data 204 through the implementation of the artificial intelligence component 210, the first cognitive learning operation 218, and the second cognitive operation. The method 1100 may further establish an anomaly library, by associating the data anomaly cluster 232 and the data accommodation model 238 for the time duration 216 identified by the artificial intelligence component 210 with a data modeling requirement. The method 1100 may include deploying the anomaly library for validation of the data anomaly cluster 232.

In an example, the method 1100 may be practiced using a non-transitory computer-readable medium. In an example, the method 1100 may be a computer-implemented method.

The present disclosure provides for a data anomaly detection system that may generate break-even insights for a process while incurring minimal technical costs. Furthermore, the present disclosure may categorically analyze various parameters to understand a data trend, identify right anomalies and reinforce the learning from anomalies detected to automatically update the data trend to solve the problem of anomaly detection on a real-time basis in an efficient and accurate manner.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:
1. A system comprising:
a processor;
a data dissector coupled to the processor, the data dissector to:
  obtain a query from a user, the query indicating a data anomaly detection requirement;
  obtain target data from a plurality of data sources associated with the data anomaly detection requirement;
  implement an artificial intelligence component to sort the target data into a plurality of data wedges, each data wedge comprising a plurality of events, each event comprising a portion of the target data obtained over a time duration identified by the artificial intelligence component; and
  create a data pattern model for each of the plurality of data wedges, the data pattern model comprising each of the plurality of events associated with a data wedge from the plurality of data wedges for a specific interval of time from the time duration;
a data mapper coupled to the processor, the data mapper to implement a first cognitive learning operation to:
  identify a data threshold value for each of the plurality of events from the target data, the data threshold value indicative of data probity;
  determine a data probity score for each of the plurality of events based on mapping the data pattern model with the data threshold value; and
  create a data probity index for the data pattern model associated with each of the plurality of data wedges, the data probity index comprising the associated plurality of events arranged according to their respective data probity scores; and
a data rectifier coupled to the processor, the data rectifier to implement a second cognitive learning operation to:
  identify a data anomaly cluster for each data pattern model based on mapping the data probity index for the data pattern model with the data probity index for a historical data pattern model for a corresponding interval of time from the time duration, the historical data pattern model being obtained from the target data and the data anomaly cluster including outlier data from the target data;
update the data threshold value based on the data anomaly cluster corresponding to each of the plurality of data wedges;
generate a data anomaly detection result corresponding to the data anomaly detection requirement, the data anomaly detection result comprising the data pattern model for a data wedge from the plurality of data wedges deficient of the data anomaly cluster relevant for resolution to the query; and
initiate anomaly detection on the target data to resolve the query based on the data anomaly detection result.

2. The system as claimed in claim 1, wherein the data dissector is to obtain the target data on a real-time basis.

3. The system as claimed in claim 1, wherein the time duration includes twenty-four hours of a day, and the specific interval of time includes a one-hour time interval.

4. The system as claimed in claim 1, wherein the data rectifier is to establish a data accommodation model corresponding to each of the plurality of data wedges, the data accommodation model comprising an associated data pattern model for a data wedge from the plurality of data wedges deficient of the data anomaly cluster.

5. The system as claimed in claim 1, wherein the data rectifier is to further determine a data accommodation index indicative of a level of data anomaly detection achieved in at least a part of the target data through the implementation of the artificial intelligence component, the first cognitive learning operation, and the second cognitive operation.

6. The system as claimed in claim 1, wherein the data rectifier is to further establish an anomaly library, by associating the data anomaly cluster and the data anomaly detection result for the time duration identified by the artificial intelligence component with a data anomaly detection requirement.

7. The system as claimed in claim 6, wherein the system is to deploy the anomaly library for validation of the data anomaly cluster.

8. A method comprising:
obtaining, by a processor, a query from a user, the query indicating a data anomaly detection requirement;
obtaining, by the processor, target data from a plurality of data sources associated with the data anomaly detection requirement;
implementing, by the processor, an artificial intelligence component to sort the target data into a plurality of data wedges, each data wedge comprising a plurality of events, each event comprising a portion of the target data obtained over a time duration identified by the artificial intelligence component;
creating, by the processor, a data pattern model for each of the plurality of data wedges, the data pattern model comprising each of the plurality of events associated with a data wedge from the plurality of data wedges for a specific interval of time from the time duration;
implementing, by the processor, a first cognitive learning operation to identify a data threshold value for each of the plurality of events from the target data, the data threshold value indicative of data probity;
implementing, by the processor, the first cognitive learning operation to determine a data probity score for each of the plurality of events based on mapping the data pattern model with the data threshold value;
implementing, by the processor, the first cognitive learning operation to create a data probity index for the data pattern model associated with each of the plurality of data wedges, the data probity index comprising the associated plurality of events arranged according to their respective data probity scores;
implementing, by the processor, a second cognitive learning operation to identify a data anomaly cluster for each data pattern model based on mapping the data probity index for the data pattern model with the data probity index for a historical data pattern model for a corresponding interval of time from the time duration, the historical data pattern model being obtained from the target data and the data anomaly cluster including outlier data from the target data;
implementing, by the processor, the second cognitive learning operation to update the data threshold value based on the data anomaly cluster corresponding to each of the plurality of data wedges;
implementing, by the processor, the second cognitive learning operation to generate a data anomaly detection result corresponding to the data anomaly detection requirement, the data anomaly detection result comprising data pattern model for a data wedge from the plurality of data wedges deficient of the data anomaly cluster relevant for resolution to the query; and
implementing, by the processor, the second cognitive learning operation to initiate anomaly detection on the target data to resolve the query based on the data anomaly detection result.

9. The method as claimed in claim 8, wherein the method further comprises obtaining, by the processor, the target data on a real-time basis.

10. The method as claimed in claim 8, wherein the time duration includes twenty-four hours of a day, and the specific interval of time includes a one-hour time interval.

11. The method as claimed in claim 8, wherein the method further comprises establishing a data accommodation model corresponding to each of the plurality of data wedges, the data accommodation model comprising an associated data pattern model for a data wedge from the plurality of data wedges deficient of the data anomaly cluster.

12. The method as claimed in claim 8, wherein the method further comprises determining, by the processor, a data accommodation index indicative of a level of data anomaly detection achieved in at least a part of the target data through the implementation of the artificial intelligence component, the first cognitive learning operation, and the second cognitive operation.

13. The method as claimed in claim 8, wherein the method further comprises establishing, by the processor, an anomaly library, by associating the data anomaly cluster and the data anomaly detection result for the time duration identified by the artificial intelligence component with a data anomaly detection requirement.

14. The method as claimed in claim 13, wherein the method further comprises deploying, by the processor, the anomaly library for validation of the data anomaly cluster.

15. A non-transitory computer readable medium including machine readable instructions that are executable by a processor to:
obtain a query from a user, the query indicating a data anomaly detection requirement;
obtain target data from a plurality of data sources associated with the data anomaly detection requirement;
implement an artificial intelligence component to sort the target data into a plurality of data wedges, each data wedge comprising a plurality of events, each event comprising a portion of the target data obtained over a time duration identified by the artificial intelligence component;

create a data pattern model for each of the plurality of data wedges, the data pattern model comprising each of the plurality of events associated with a data wedge from the plurality of data wedges for a specific interval of time from the time duration;

implement a first cognitive learning operation to identify a data threshold value for each of the plurality of events from the target data, the data threshold value indicative of data probity;

implement the first cognitive learning operation to determine a data probity score for each of the plurality of events based on mapping the data pattern model with the data threshold value;

implement the first cognitive learning operation to create a data probity index for the data pattern model associated with each of the plurality of data wedges, the data probity index comprising the associated plurality of events arranged according to their respective data probity scores;

implement a second cognitive learning operation to identify a data anomaly cluster for each data pattern model based on mapping the data probity index for the data pattern model with the data probity index for a historical data pattern model for a corresponding interval of time from the time duration, the historical data pattern model being obtained from the target data and the data anomaly cluster including outlier data from the target data;

implement the second cognitive learning operation to update the data threshold value based on and the data anomaly cluster corresponding to each of the plurality of data wedges;

implement the second cognitive learning operation to generate a data anomaly detection result corresponding to the data anomaly detection requirement, the data anomaly detection result comprising the data pattern model for a data wedge from the plurality of data wedges deficient of the data anomaly cluster relevant for resolution to the query; and initiate anomaly detection on the target data to resolve the query based on the data anomaly detection result.

16. The non-transitory computer-readable medium of claim 15, wherein the time duration includes twenty-four hours of a day, and the specific interval of time includes a one-hour time interval.

17. The non-transitory computer-readable medium of claim 15, wherein the processor is to establish a data accommodation model corresponding to each of the plurality of data wedges, the data accommodation model comprising an associated data pattern model for a data wedge from the plurality of data wedges deficient of the data anomaly cluster.

18. The non-transitory computer-readable medium of claim 15, wherein the processor is to further determine a data accommodation index indicative of a level of data anomaly detection achieved in at least a part of the target data through the implementation of the artificial intelligence component, the first cognitive learning operation, and the second cognitive operation.

19. The non-transitory computer-readable medium of claim 15, wherein the processor is to establish an anomaly library, by associating the data anomaly cluster and the data anomaly detection result for the time duration identified by the artificial intelligence component with a data anomaly detection requirement.

20. The non-transitory computer-readable medium of claim 19, wherein the processor is to deploy the anomaly library for validation of the data anomaly cluster.

* * * * *